(12) United States Patent
Park

(10) Patent No.: US 7,240,367 B2
(45) Date of Patent: Jul. 3, 2007

(54) USER INTERFACE AND METHOD FOR INPUTTING PASSWORD AND PASSWORD SYSTEM USING THE SAME

(75) Inventor: Seoung-Bae Park, 106-503, Samik Apt., Songha-dong, Nam-gu, Gwangju-shi (KR)

(73) Assignees: Seoung-Bae Park, Gwangju-shi (KR); Shinbitech Co., Ltd., Buk-gu, Gwangju (KR)

( * ) Notice: Subject to any disclaimer, the term of this patent is extended or adjusted under 35 U.S.C. 154(b) by 864 days.

(21) Appl. No.: 10/389,924

(22) Filed: Mar. 18, 2003

(65) Prior Publication Data

US 2004/0030933 A1 Feb. 12, 2004

(30) Foreign Application Priority Data

Aug. 9, 2002 (KR) ............. 10-2002-0047012
Dec. 30, 2002 (KR) ............. 10-2002-0086889

(51) Int. Cl.
*H04L 9/32* (2006.01)
*G06F 7/04* (2006.01)
*G06F 21/00* (2006.01)

(52) U.S. Cl. .......................... 726/18; 726/6
(58) Field of Classification Search .............. None
See application file for complete search history.

(56) References Cited

U.S. PATENT DOCUMENTS

| | | | | |
|---|---|---|---|---|
| 5,465,084 A | * | 11/1995 | Cottrell | 340/5.27 |
| 5,559,961 A | * | 9/1996 | Blonder | 726/18 |
| 5,608,387 A | * | 3/1997 | Davies | 340/5.27 |
| 5,821,933 A | * | 10/1998 | Keller et al. | 715/741 |
| 6,192,478 B1 | * | 2/2001 | Elledge | 726/18 |
| 6,209,104 B1 | * | 3/2001 | Jalili | 726/18 |
| 2003/0005338 A1 | * | 1/2003 | Solioz | 713/202 |
| 2004/0030934 A1 | * | 2/2004 | Mizoguchi et al. | 713/202 |
| 2004/0260955 A1 | * | 12/2004 | Mantyla | 713/202 |
| 2005/0010785 A1 | * | 1/2005 | Abe et al. | 713/182 |
| 2006/0174339 A1 | * | 8/2006 | Tao | 726/18 |

OTHER PUBLICATIONS

Ku et al, "A Remote User Authentication Scheme Using Strong Graphical Passwords", 2005, Proceedings of the IEEE Conference of Local Computer Networks 30th Anniversary (LCN '05), p. 1-5.*

(Continued)

*Primary Examiner*—Christopher Revak
(74) *Attorney, Agent, or Firm*—Robert E. Bushnell, Esq.

(57) ABSTRACT

A password system and a method for authenticating a user of such a password system are disclosed. The present invention provides a novel method for inputting a password which is capable of preventing a password from being revealed to others observing the course of inputting the password, and an improved password system which is capable of providing a user interface suitable to such a method for inputting a password. The user interface provides at least two symbol boards, and symbols arranged on the two symbol boards are matched by means of matching means provided to a user. At this time, the symbols matched for inputting the password and other different false symbols disguised as the symbols matched for inputting the password are matched simultaneously, whereby it is not possible for an observer to distinguish which of the symbol matching is the one for inputting the password.

37 Claims, 23 Drawing Sheets

OTHER PUBLICATIONS

Weidenbeck et al, "Authentication Using Graphical Passwords: Effects of Tolerance and Image Choice", Jul. 2005, Symposium On Usable Privacy and Security (SOUPS), p. 1-12.*

Pierce et al, "Graphical Authentication: Justifications and Objectives", 2004, p. 1-6.*

* cited by examiner

|       | MSG                                                                                    |
|-------|----------------------------------------------------------------------------------------|
| MSG_1 | (1, 2), (2, 9), (3, 5), (4, 7), (5, 6), (6, 1), (7, 3), (8, 4), (9, 8)                 |
| MSG_2 | (1, 8), (2, 2), (3, 6), (4, 9), (5, 5), (6, 7), (7, 1), (8, 3), (9, 4)                 |
| MSG_3 | (1, 5), (2, 6), (3, 1), (4, 7), (5, 2), (6, 4), (7, 3), (8, 9), (9, 8)                 |
| MSG_4 | (1, 1), (2, 3), (3, 8), (4, 4), (5, 5), (6, 2), (7, 9), (8, 7), (9, 6)                 |

RMSG derived from two-password    Symbols of MSG matched with derived RMSG

USER INTERFACE AND METHOD FOR INPUTTING PASSWORD AND PASSWORD SYSTEM USING THE SAME

CLAIM OF PRIORITY

This application claims priority to an application entitled "USER INTERFACE AND METHOD FOR INPUTTING PASSWORD AND PASSWORD SYSTEM USING THE SAME", filed in the Korean Intellectual Property Office on Aug. 9, 2002 and assigned Serial No. 2002-47012, and on Dec. 30, 2002, and assigned Serial No. 2002-86889, the contents of which are hereby incorporated by reference.

BACKGROUND OF THE INVENTION

1. Field of the Invention

The present invention relates generally to a password system and a user interface for such a password system, and more particularly to a novel method for inputting a password that is capable of preventing the password from being revealed to others observing the course of inputting a password, and to an improved password system that is capable of providing a user interface suitable to such a method for inputting a password.

2. Description of the Related Art

A user authenticating system is widely used in various apparatus and systems. User authentication is to verify whether a person who has access to a system is authorized. In actual environment, the user authentication is materialized by means of a user authenticating system. The user authentication system is composed of software and hardware, which are combined with each other. The user authentication is carried out using information provided by a user and information stored in the system.

The information provided by the user includes memorized information, information stored in media owned by the user, and vital information. An example of the memorized information may be an ID or a password; an example of the media owned by the user may be a card; an example of the vital information may be a fingerprint.

Generally, a user authenticating system using the information memorized by the user is software, while a user authenticating system using the media or the vital information is a combination of software and hardware. An example of the user authenticating system comprised of a combination of software and hardware may be a fingerprint recognizing system, which is comprised of a fingerprint recognizing apparatus for inputting a fingerprint information and software for processing a digital fingerprint.

A password system may be a user authenticating system, which uses information memorized by the user. Such a password system, in which the user inputs an ID and a password, is used widely. The password system includes a system related module and a user interface related module. Furthermore, a module materialized by a coding technology may be used selectively according to a system in use.

Generally, a password system of the system having only one user does not include a code module or other security platform modules. Examples of such a password system include a desktop alone and a cellular phone. Generally, a password system of the system having several users includes a code module or other security platform modules. Examples of such a password system include an internet banking system using a public key base structure and a UNIX system.

The password system is one of the user authenticating systems, which is used very widely, in that its use is convenient, its price is low, and its materialization is easy. However, the conventional password system has a drawback in that a password may be easily revealed to others observing the course of inputting the password.

SUMMARY OF THE INVENTION

Accordingly, it is an object of the present invention to provide a method for inputting a password that is capable of preventing a password from being revealed to others observing the course of inputting the password.

It is another object of the present invention to provide a user interface for inputting a password that is capable of preventing a password from being perceived by others observing the course of inputting the password.

It is still another object of the present invention to provide a password system with an authenticating process suitable to a method for inputting a password that is capable of preventing a password from being perceived by others observing the course of inputting the password.

In one aspect of the present invention to accomplish the aforementioned objects, a password system comprises: display means for displaying a matching symbol board on which arranged and displayed are a plurality of symbols including one real matching symbol, which is the standard of matching, and several virtual matching symbols, which are provided for disguising or concealing the real matching symbol, and a password symbol board on which arranged and displayed are a plurality of symbols including one real password symbol, which is to be matched with the real matching symbol, and several virtual password symbols, which are provided for disguising or concealing the real password symbol; symbol creating means for creating symbol groups to be displayed on the matching symbol board and the password symbol board; display control means for receiving information about the symbol groups created at the symbol creating means, and for arranging and displaying the received information on the matching symbol board and the password symbol board; matching means for matching the real matching symbol and the real password symbol; matching symbol processing means for creating a matched symbol group when several symbols arranged on the matching symbol board and the password symbol board are matched by means of the matching means, and for inputting the matched symbol group to authentication processing means; a memory for storing an authenticating reference information; and authentication processing means for allowing or denying the user's access to a main system by determining whether the real password symbol is matched with the real matching symbol included in the matched symbol group inputted on the basis of the authenticating reference information.

In another aspect of the present invention, a method for authenticating a user of a password system comprises the steps of: creating a first symbol group including one real matching symbol, which is the standard of matching, and several virtual matching symbols, which are provided for disguising or concealing the real matching symbol, and a second symbol group including one real password symbol, which is to be matched with the real matching symbol, and several virtual password symbols, which are provided for disguising or concealing the real password symbol; displaying a matching symbol board for displaying the first symbol group and a password symbol board for displaying the second symbol group by display means; inputting a password by matching the real matching symbol of the matching symbol board and the real password symbol of the password symbol board by matching means; creating a matched symbol group after the symbol of the matching symbol board is matched with the symbol of the password symbol board so that it can be inputted to authentication processing means; and processing authentication for allowing or denying the user's access to the main system on the basis of the authenticating reference information for authenticating process and the matched symbol group which has been inputted.

BRIEF DESCRIPTION OF THE DRAWINGS

The preferred embodiments of the present invention will now be described by way of example with reference to the accompanying drawings in which:

FIG. 3a illustrates a real matching symbol (RMS), a virtual matching symbol (VMS), a real password symbol (RPS), and a virtual password symbol (VPS), respectively, which are used on the number array shown in FIG. 1a;

FIG. 18 illustrates an example of a user interface of the two-password system linked with an electronic circuit;

DETAILED DESCRIPTION OF THE PREFERRED EMBODIMENT

Figure 1A:
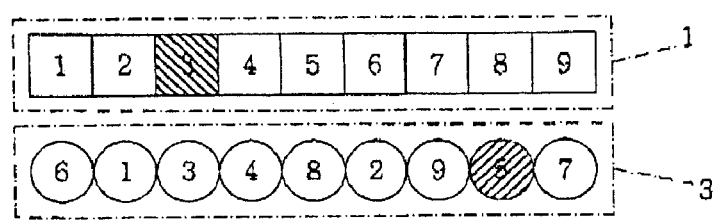
FIG. 1a and FIG. 1b are schematic views for explaining a method for inputting a password according to the present invention, respectively, FIG. 1a showing a number array before matching and FIG. 1b showing a number array after matching.

The present invention provides a method for inputting a password which is capable of preventing a password from being revealed to others observing the course of inputting the password, a user interface for inputting such a password, and a password system with an authenticating process suitable to such a method for inputting a password. The following description of preferred embodiments of the present invention is illustrative only, and thus it is to be understood that the present invention is not limited by such preferred embodiments. It will be obvious to those skilled in the art that the present invention can be applied to any apparatus or method requiring a password input.

In the description of the preferred embodiments of the present invention, a method for inputting a password which is capable of preventing any exposure of the password before anything else. In the second place, the definition of a two-password system corresponding to a password input according to the present invention and a method for deriving a real matching symbol group and a real password symbol group from it will be described. In the third place, a user interface suitable to a method for inputting a password according to the present invention will be described, and finally a password system employing such a method for inputting a password and a password authenticating process will be described. Similar reference numerals will be used in connection with similar structures or methods in the preferred embodiments of the present invention, and repetitive description thereof will be omitted. The preferred embodiments of the present invention will now be described with reference to the accompanying drawings.

1. A Method for Inputting a Password Provided for Preventing Exposure of the Password A method for inputting a password according to the present invention allows a user to match at least two symbols in accordance with a prescribed matching rule. The password input is carried out by more than one repetition of such a matching process. A virtual matching of at least one different symbol is carried out simultaneously in order to disguise a specific symbol pair matched for a password input. In this way, several symbols are matched simultaneously, and thus an observer cannot be aware of which is a real symbol matching for a password input with the result that any exposure of the password is prevented.

Figure 1B:
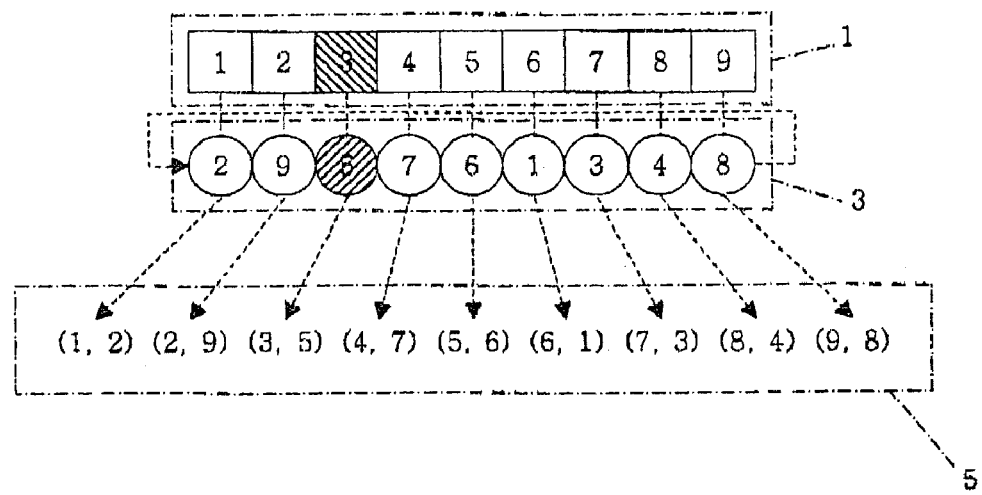

FIG. 1a and FIG. 1b are schematic views for explaining a method for inputting a password according to the present invention, respectively. FIG. 1a shows a number array before matching, and FIG. 1b shows a number array after matching. Referring to the drawings, a first number array 1 including several numbers is placed on the upper portion, and a second number array 3 including several numbers is placed on the upper portion. Here, the numbers in the first number array 1 may be arranged in order, while the numbers in the second number array 3 may be arranged at random. A method for arranging symbols will be described in detail together with the following description of a user interface. The first number array 1 and the second number array 3 may be represented as a form of a graphic user interface displayed on a display unit.

A user inputs a password by matching a specific number in the first number array 1 with a specific number in the second number array 3 in accordance with a prescribed matching rule. For example, the matching rule is to arrange specific numbers in the first number array 1 and the second number array 3 on the same vertical column.

When the numbers to be matched for inputting a password are the number '3' in the first number array 1 and the number '5' in the second number array 3, the number '3' in the first number array 1 and the number '5' in the second number array 3 are not arranged vertically with respect to each other before matching, as shown in FIG. 1a. It should be understood that the number '3' in the first number array 1 and the number '5' in the second number array 3 are hatched in the drawings only for the purpose of better understanding of the detailed description. The aforesaid numbers are displayed in the same forms as the other numbers in a real user interface.

In order to input a password, the user shifts the second number array 3 to the right four times (or to the left five times) in circulation, so that the number '3' in the first number array 1 and the number '5' in the second number array 3 are placed on the same vertical column, as shown in FIG. 1b. At this time, the number of number pairs 5 matched on the vertical column in the first number array 1 and the second number array 3 are nine in all, which are '(1,2)', '(2,9)', '(3,5)', '(4,7)', '(5,6)', '(6,1)', '(7,3)', '(8,4)', '(9,8)' in order. The aforesaid number pairs are obtained by shifting the second number array 3 to the right four times in circulation. However, a real number pair matched for inputting a password is '(3,5)'; the other virtual matched number pairs, that is, eight virtual matched number pairs are provided to disguise or conceal the real matched number pair '(3,5)'.

Such a symbol matching is carried out repetitively at least one time in the course of a password authenticating process. Consequently, although the course of inputting a password is revealed to any observer, they are not able to recognize the inputted password (i.e., the real matched number pair). The authentication processing means (not shown) carries out password authentication on the basis of the matched number pairs, which will be described below.

Figure 2:
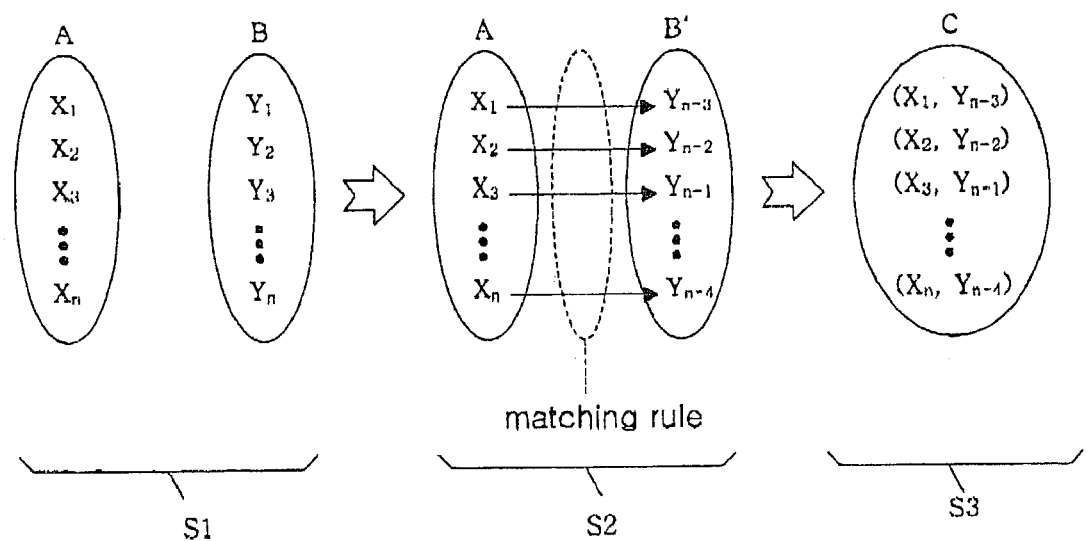
FIG. 2 is a conceptual view for explaining generalization of a method for inputting a password according to the present invention to a set concept.

FIG. 2 is a conceptual view for explaining generalization of a method for inputting a password according to the present invention to a set concept. Referring to the drawing, when there are Set A and Set B each having n symbols (n is natural number) as elements, a user selects a specific element in Set A and a specific element in Set B for inputting a password, which are matched with each other. At this time, the other elements in Set A and Set B are matched with one another on the basis of a prescribed matching rule.

As an example of a method for matching two specific elements in Set A and Set B, a method for changing a sequence of arrangement of the elements in one of the sets may be used just like the example of the number array as mentioned above. For example, a sequence of arrangement of the elements in Set B may be changed, and then created is a new Set C of the symbols matched on the basis of a prescribed matching rule, which exists between Set B' having changed sequence of arrangement and Set A.

Such a method for matching the symbols will now be described in accordance with the password input process. First of all, each element in Set A and Set B is provided at Step S1. The sequence of arrangement of the elements in Set B is changed at Step S2. At Step S3, created is Set C of pairs of symbols consisting of the elements in Set A and Set B' matched on the basis of the matching rule. The authentication processing means (not shown) carries out an authenticating process on the basis of the created Set C.

Figure 3A:
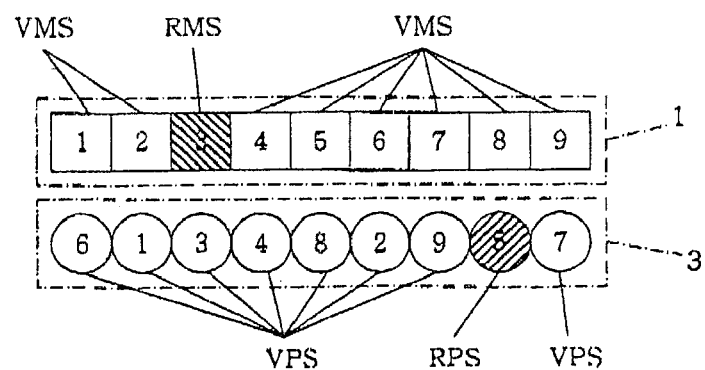

Here, a specific element in Set A, which is a standard of the matching, is called a real matching symbol (RMS), while the other elements provided for disguising the RMS are called virtual matching symbols (VMS). A specific element in Set B provided to match with the RMS is called a real password symbol (RPS), while the other elements provided for disguising the RPS are called virtual password symbols (VPS). For example, a real matching symbol, virtual matching symbols, a real password symbol, and virtual password symbols used on the number arrays shown in FIG. 1a are indicated in FIG. 3a.

Figure 3B:
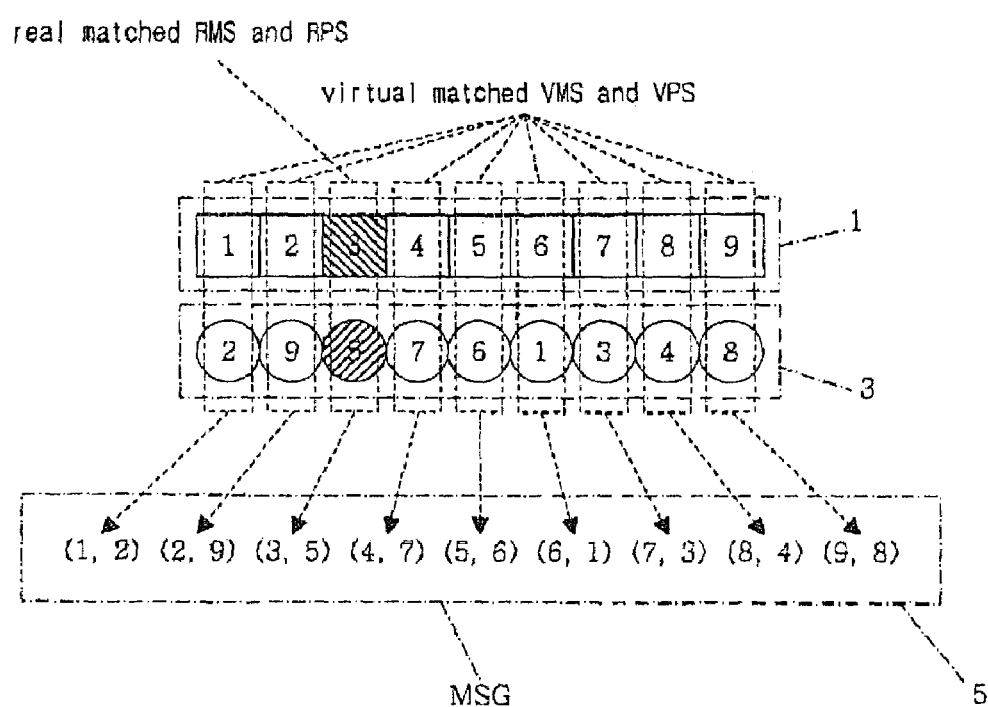
FIG. 3b illustrates an RMS and an RPS, a VMS and a VPS, and a symbol group, respectively, which are matched on the matched number array shown in FIG. 1b.
Figure 4A:
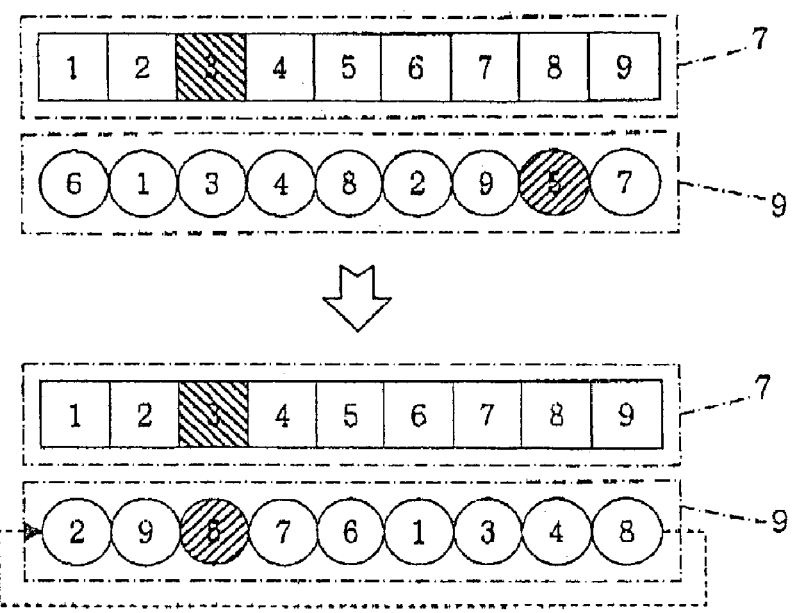
FIG. 4a to FIG. 4d are schematic views for explaining examples of inputting a two-password by repetitive execution of a large number of the symbol matching process.
Figure 4B:
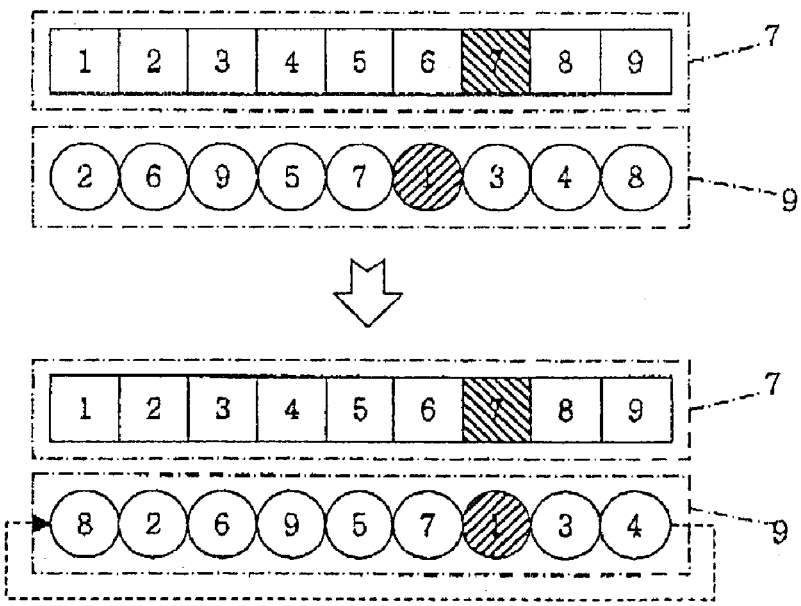
Figure 4C:
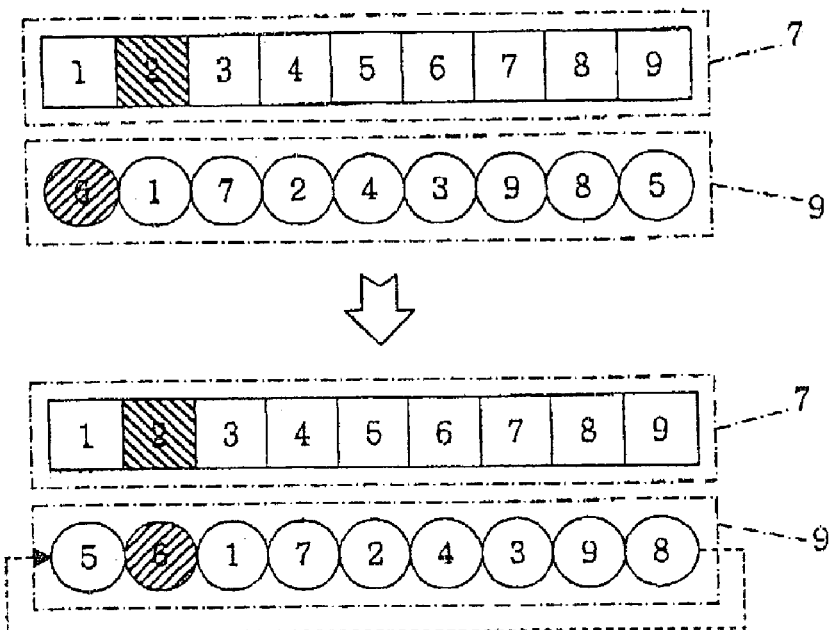
Figure 4D:
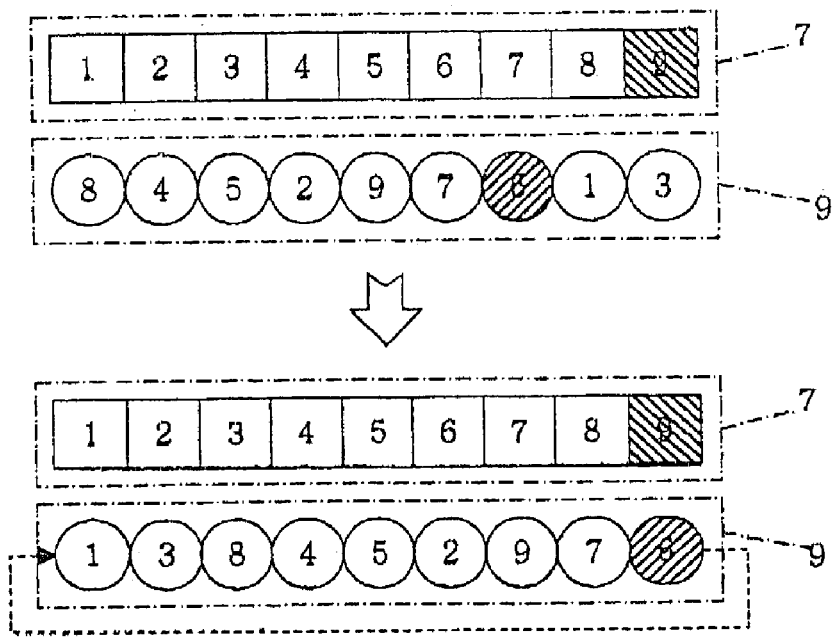

When the RMS in Set A is matched with the RPS in Set B', the VMS in Set A is matched with the VPS in Set B. The number pairs in Set C, consisting of Set A and Set B' matched on the basis of a prescribed matching rule, are called matched symbol groups (MSG). For example, the RMS and the RPS matched in the matched number array, and the VPS and the VPS matched in the matched number array, as shown in FIG. 1b, are indicated in FIG. 3b.

On the other hand, the matching of the aforesaid RMS and RPS may be made repetitively once or more in a password authenticating process. FIG. 4a to FIG. 4d are schematic views for explaining examples of inputting a two-password by repetitive execution of a large number of the symbol matching process. It should be understood that the symbols are hatched in the drawings only for the purpose of better understanding of the detailed description, and thus the aforesaid symbols are displayed in the same forms as the other symbols in a real user interface. A first number array 7 and a second number array 9 each indicated as a symbol array may be provided as a form of a graphic user interface displayed on the display unit.

In each drawing, the two number arrays shown on the upper position are the ones before the matching, while the two number arrays shown on the lower position are the ones after the matching. The matching rule is to arrange the RMS in the first number array 7 and the RPS in the second number array 9 on the same vertical column. For example, if the RMS are numbers '3', '7', '2', '9', and the RPS are numbers '5', '1', '6', '6', in order to match the RMS with the RPS, the number '3' and the number '5', '7' and '1', '2' and '6', '9' and '6' are matched in sequence using the first number array 7 and the second number array 9 displayed by gradation, as shown in FIG. 4a to FIG. 4d.

The symbol group consisting of several RMS is called a real matching symbol group (RMSG), while the symbol group consisting of several RPS is called a real password symbol group (RPSG). In the aforesaid example, the RMSG is '3729', and the RPSG is '5166'.

According to the method for inputting a password as mentioned above, when one RMS and one RPS are matched with each other, the other VMS and VPS are also matched with one another. Consequently, no one observing the course of inputting the password can recognize which is the real matching of the RMS and the RPS, and thus revealing of the password is prevented.

In the aforesaid example, the number of the symbols in the symbol array including the RMS and the VMS and the number of the symbols in the symbol array including the RPS and the VPS are the same (9 in all), although the numbers of the symbols may be different from each other. For example, the number of the symbol array arranged on the upper position may be 9, while the number of the symbol array arranged on the lower position may be 7.

2. A Two-password System and a Method for Creating RMSG and RPSG Using Such a Two-password System A password used in a method for inputting a password according to the present invention is quite different from a password used in the conventional password system. For this reason, a password used in a method for inputting a password according to the present invention is called a two-password method in order to distinguish between the password of the present invention and the password of the conventional art.

The password used in the conventional password system is a symbol group consisting of symbols arranged in sequence. Consequently, it is sufficient to input a defined symbol group as a password in sequence to a password system according to the predetermined order when inputting the password. For example, where a password of a credit card is set to '2976', an owner of the credit card must input the numbers '2', '9', '7', and '6' in sequence using the numeric keypad fitted to an automated-teller machine in order to use the automated-teller machine using the credit card.

On the contrary, a two-password method used in a method for inputting a password according to the present invention is quite different from the conventional password having such a use form. That is to say, some of the two-password sets may be composed of RMSG, and the other of the two-password sets may be composed of RPSG. Alternatively, the two-password set may be one of the RMSG and RPSG, and the other may be derived from it. In this manner, the symbol group composed of the RMSG and RPSG, which are two different symbol groups, is the two-password set. Two different symbol groups are a first password and a second password.

A method for creating RMSG and RPSG from the two-password set will now be described in detail with reference to FIG. 5a to FIG. 5d, FIG. 6a and FIG. 6b.

Figure 5A:
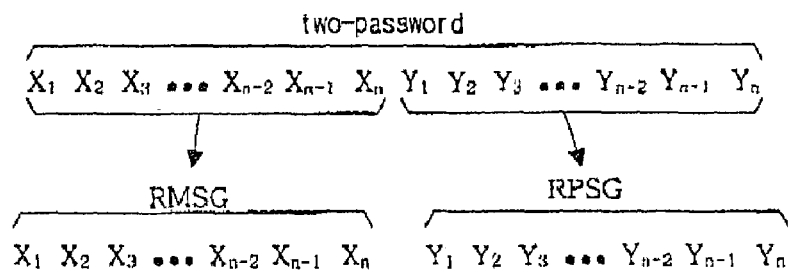
FIG. 5a to FIG. 5d, FIG. 6a and FIG. 6b illustrate various examples of creating an RMSG and an RPSG from the two-password system.

First of all, detailed description of an example wherein the two-password set is composed of the RMSG and the RPSG will be made. For example, if the two-password is '37295166', the fore part of the numbers, '3729', may be the RMSG, and the back part of the numbers, '5166', may be the RPSG. In this case, the sequential pairs of the RMS and the RPS matched for inputting a password are '(3,5)', '(7,1)', '(2,6)', and '(9,6)'. A method for creating RMSG and RPSG from such a two-password set can be generalized as follows. As shown in FIG. 5a, the RMSG and the RPSG are as follows in definition of the two-password set. At this time, the sequential pairs of the RMS and the RPS can be expressed by the following generalization.

Two-password: $X_1X_2X_3 \ldots X_{n-2}X_{n-1}X_nY_1Y_2Y_3 \ldots Y_{n-2}Y_{n-1}Y_n$
(n is natural number)
RMSG: $X_1X_2X_3 \ldots X_{n-2}X_{n-1}X_n$
RPSG: $Y_1Y_2Y_3 \ldots Y_{n-2}Y_{n-1}Y_n$
Sequential pairs of RMS and RPS ($RMS_i$, $RPS_i$): ($X_i$, $Y_i$)
($1 \leq i \leq n$)

Figure 5B:
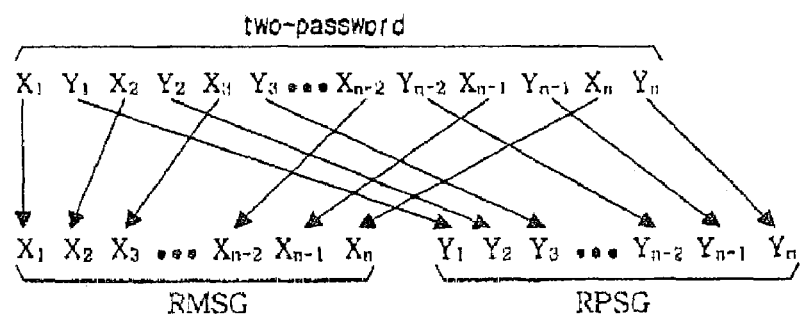

In the second place, as another example of a two-password set comprised of RMSG and RPSG, the RMSG and the RPSG each may be formed from the groups of the numbers selected alternately in the two-password. For example, if the two-password set is '37295166', the numbers, '3256', may be the RMSG, and the numbers, '7916', may be the RPSG. In this case, the sequential pairs of the RMS and the RPS matched for inputting a password are '(3,7)', '(2,9)', '(5,1)', and '(6,6)'. A method for creating RMSG and RPSG from such a two-password set can be generalized as follows. As shown in FIG. 5b, the RMSG and the RPSG are as follows in definition of the two-password set. At this time, the sequential pairs of the RMS and the RPS can be expressed by the following generalization.

Two-password: $X_1Y_1X_2Y_2X_3Y_3 \ldots X_{n-2}Y_{n-2}X_{n-1}Y_{n-1}X_nY_n$
(n is natural number)
RMSG: $X_1X_2X_3 \ldots X_{n-2}X_{n-1}X_n$
RPSG: $Y_1Y_2Y_3 \ldots Y_{n-2}Y_{n-1}Y_n$
Sequential pairs of RMS and RPS ($RMS_i$, $RPS_i$): ($X_i$, $Y_i$)
($1 \leq i \leq n$)

Figure 5C:
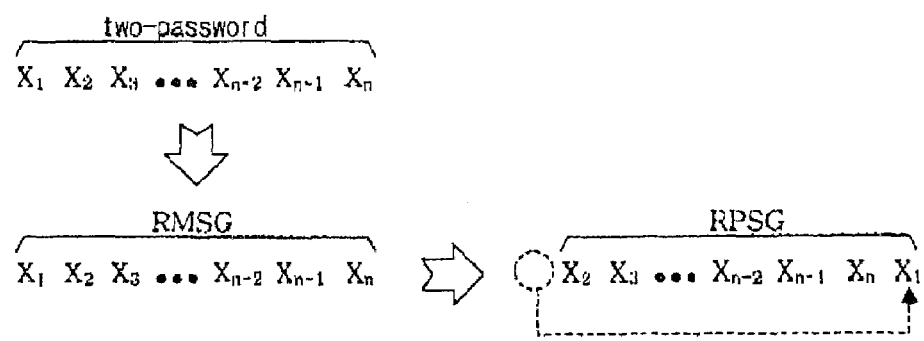

In the third place, the two-password set is the RMSG, and the RPSG is derived from it. For example, if the two-password set is '37295166', all of the numbers are used as the RMSG, and the RPSG is derived from it. For example, the rule of derivation is to use the numbers obtained by shifting the RMSG once in circulation. At that time, the RPSG is '72951663'. In this case, the sequential pairs of the RMS and the RPS matched for inputting a password are '(3,7)', '(7,2)', '(2,9)', '(9,5)', '(5,1)', '(1,6)', '(6,6)', and '(6,3)'. A method for creating RMSG and RPSG from such a two-password set can be generalized as follows. As shown in FIG. 5c, the RMSG and the RPSG are as follows in definition of the two-password set. At this point, the sequential pairs of the RMS and the RPS can be expressed by the following generalization.

Two-password: $X_1X_2X_3 \ldots X_{n-2}X_{n-1}X_n$ (n is natural number)
RMSG: $X_1X_2X_3 \ldots X_{n-2}X_{n-1}X_n$
RPSG: $X_2X_3 \ldots X_{n-2}X_{n-1}X_nX_1$
Sequential pairs of RMS and RPS ($RMS_i$, $RPS_i$):
($X_i$, $X_{i+1}$)($1 \leq i \leq n-1$), ($X_i$, $X_1$)(i=n)

Figure 5D:
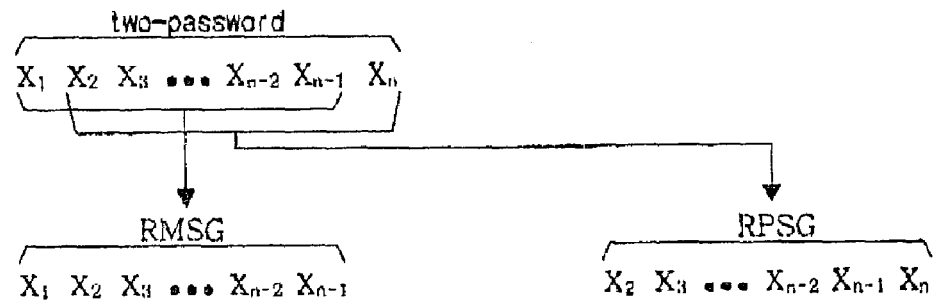

In the fourth place, a portion of the two-password set is the RMSG, and another portion of the two-password set including the portion of the RMSG is the RPSG. For example, if the two-password set is '37295166', a group of the numbers excluding the last number, '3729516', is used as the RMSG, and a group of the numbers excluding the first number, '7295166', is used as the RPSG. In this case, the sequential pairs of the RMS and the RPS matched for inputting a password are '(3,7)', '(7,2)', '(2,9)', '(9,5)', '(5,1)', '(1,6)', and '(6,6)'. A method for creating RMSG and RPSG from such a two-password set can be generalized as follows. As shown in FIG. 5d, the RMSG and the RPSG are as follows in definition of the two-password set. At this time, the sequential pairs of the RMS and the RPS can be expressed by the following generalization.

Two-password: $X_1 X_2 X_3 \ldots X_{n-2} X_{n-1} X_n$ (n is natural number)
RMSG: $X_1 X_2 X_3 \ldots X_{n-2} X_{n-1}$
RPSG: $X_2 X_3 \ldots X_{n-2} X_{n-1} X_n$
Sequential pairs of RMS and RPS ($RMS_i$, $RPS_i$):
($X_i$, $X_{i+1}$) ($1 \leq i \leq n-1$)

Figure 6A:
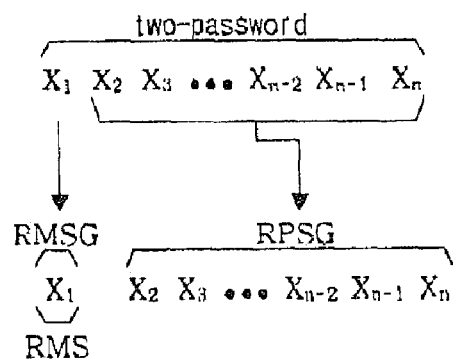
Figure 6B:
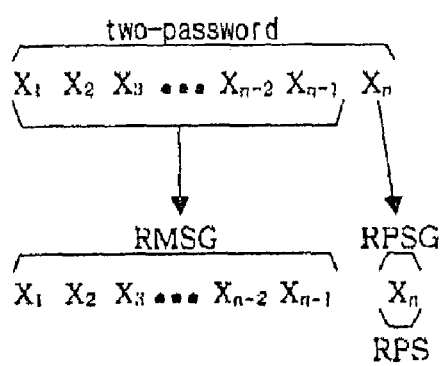

As described in detail above, there are several methods for creating the RMSG and the RPSG from the two-password set. In the above examples, the RMSG and the RPSG created from the two-password set have correspondence relations of 1:1, although they have other correspondence relations of 1:n or n:1. As shown in FIG. 6a and FIG. 6b, for example, only one RMS may be created as the RMSG from the two-password set while the other symbol group is created as the RPSG, and vice versa. At this time, the sequential pairs of the RMS and the RPS can be expressed generally as follows:

Sequential pairs of RMS and RPS ($RMS_i$, $RPS_i$):
($X_1$, $X_{i+1}$) ($1 \leq i \leq n-1$)
Sequential pairs of RMS and RPS ($RMS_i$, $RPS_i$):
($X_i$, $X_n$) ($1 \leq i \leq n-1$)

As can be seen from the above, various modifications and applications may be made to the method for the RMSG and the RPSG from the two-password set and the method for making the sequential pairs of the RMS and the RPS. It will be understood by those skilled in the art, however, that such various modifications and applications are obvious on the basis of the present invention, and thus all possible modifications and application that are not described herein may fall within the spirit and scope of the present invention. Although the detailed description will be omitted, it is possible to extend the two-password set to a three-password set or even to a four-password set or more by adapting the basic definition of the two-password set. However, a situation of a user using the password should be considered in such applications and extensions. That is to say, it should be easy for the user to memorize the two-password, and it should not be difficult to match the symbols for inputting the two-password set.

3. A User Interface for Inputting a Two-password Set and a Two-password System

A method for inputting a password by means of symbol matching according to the present invention as mentioned above is realized by a user interface suitable to such a method. Also, a password authenticating process carried out on the basis of the matched symbol pairs is provided suitable to it, which will be described later.

Figure 7:
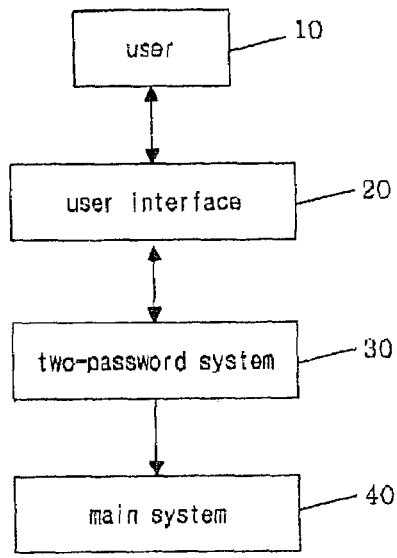
FIG. 7 is a block diagram showing the relations between a two-password system according to the present invention and a main system employing such a two-password system.

FIG. 7 is a block diagram showing the relations between a two-password system according to the present invention and a main system employing such a two-password system. A two-password system 30 provides a user interface 20 by which a user can input a two-password set. The user interface 20 includes interface means by which a user can input a two-password set through symbol matching. The two-password system 30 receives the two-password set inputted by a user through the user interface 20 to carry out an authenticating process, and allow the authorized user to have access to a main system 40.

The user interface 20 is not limited by several embodiments, which will be described later, and thus detailed embodiments of the user interface 20 is provided only for the purpose of understanding the present invention. Therefore, the concrete constructions of the user interface 20 may be modified applicably depending on the characteristic of the main system 40 employing the two-password system 30.

For example, where the two-password system 30 is built in a personal computer system, the user interface 20 may include a graphic user interface. Where the two-password system is built in an electrical door lock system, the user interface 20 may be realized in the form of a mechanical mechanism or an electronic circuit.

Figure 8:
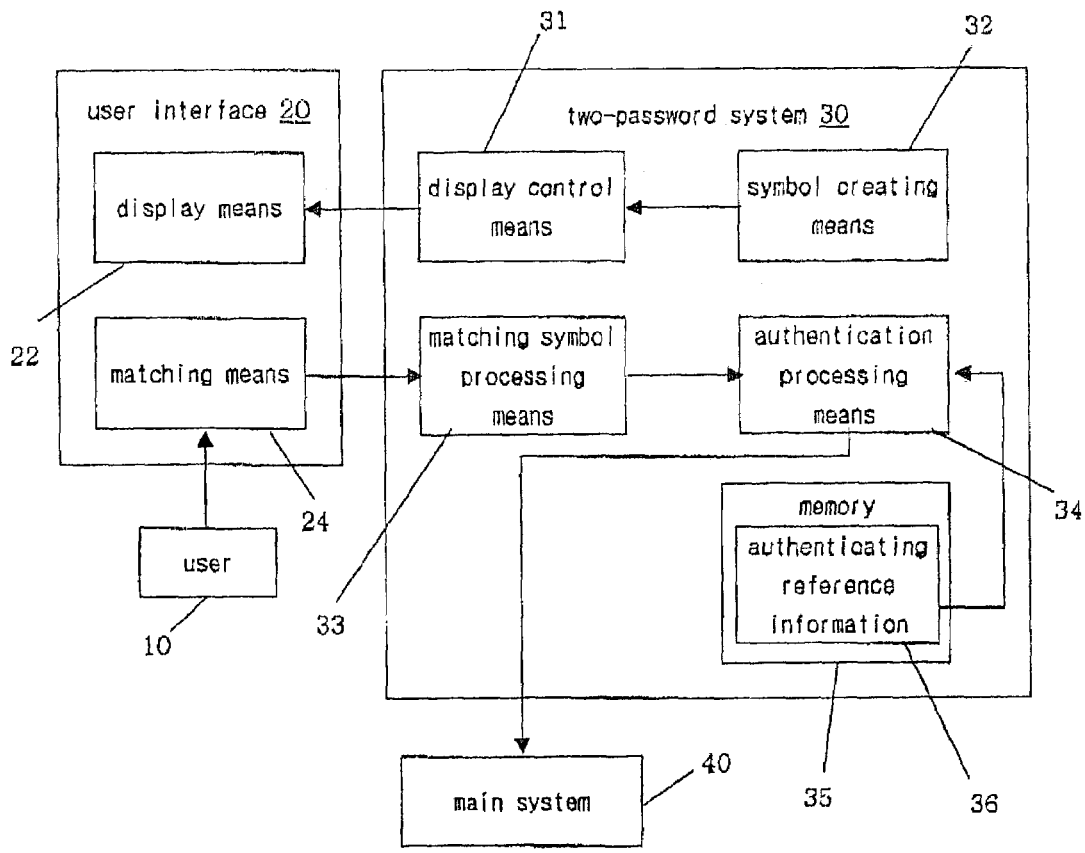
FIG. 8 illustrates the structures of a two-password system and a user interface according to the present invention.

The constructions of the user interface 20 and the two-password system 30 will be described in detail. FIG. 8 illustrates the structures of a two-password system and a user interface according to the present invention, and FIG. 9 is a schematic flowchart showing an authenticating process of a two-password system according to the present invention.

The two-password system 30 according to a preferred embodiment of the present invention generally comprises display control means 31, symbol creating means 32, matching symbol processing means 33, authentication processing means 34, and a memory 35. The user interface 20 for inputting the two-password set comprises display means 22 and matching means 24.

Figure 9:
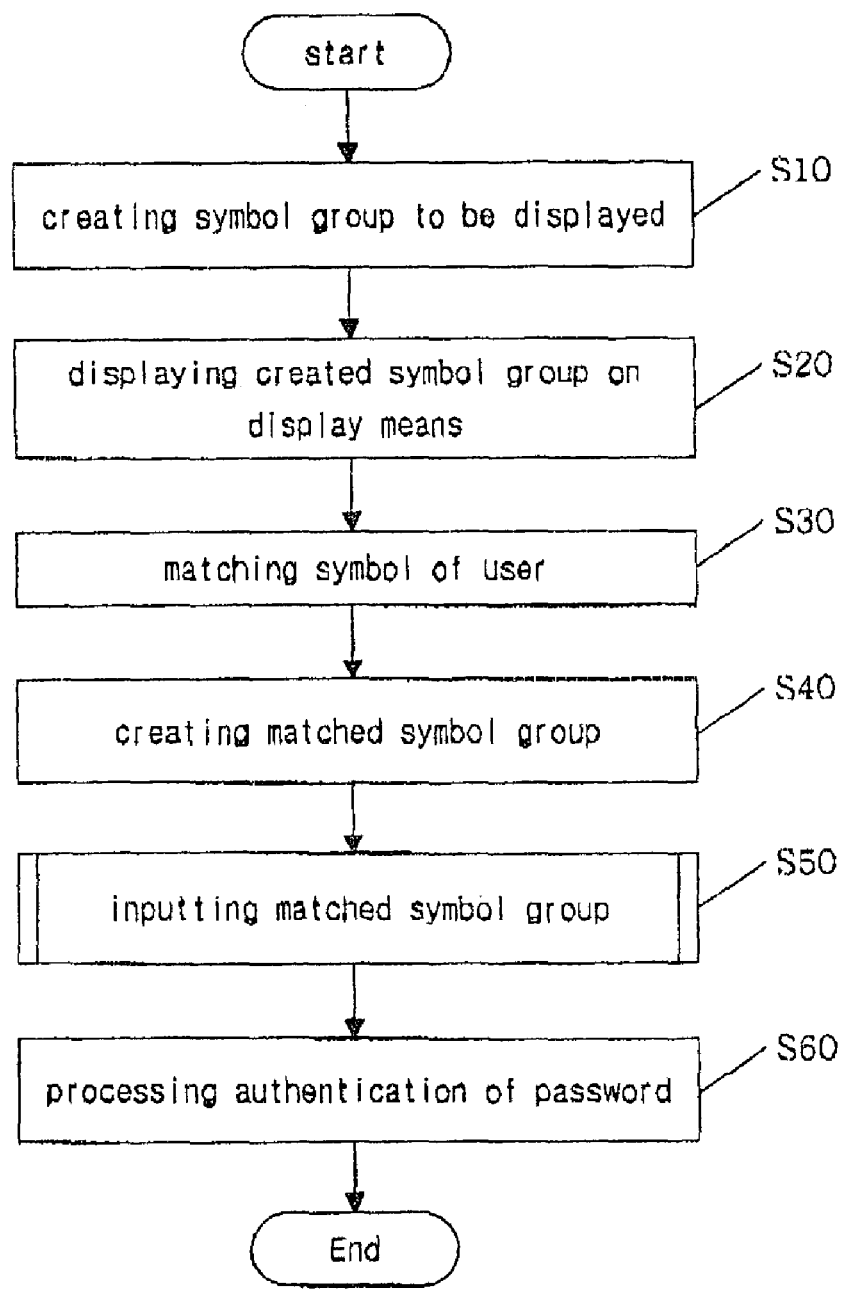
FIG. 9 is a schematic flowchart showing an authenticating process of a two-password system according to the present invention.

Referring to FIG. 8 and FIG. 9, the symbol creating means 32 creates a symbol group, which is an array of the symbols including a real matching symbol RMS, a virtual matching symbol VMS, a real password symbol RPS, and a virtual password symbol VPS, which are to be displayed on the display means 22, and provides the created symbol group to the display control means 31 at Step S10. The display control means 31 outputs the provided symbol group to the display means 22, and the display means 22 displays the symbol group under the control of the display control means 31 at Step S20.

A user 10 matches the symbols displayed on the display means 22 using the matching means 24 at Step S30. The matching symbol processing means 33 creates a matched symbol group MSG on the basis of the user's input through the matching means 24 at Step S40. The matched symbol group is inputted to the authentication processing means 34 at Step S50.

The authentication processing means 34 carries out a prescribed password authenticating process on the basis of authenticating reference information 36 stored in the memory 35 at Step S60, which will be described below in detail.

In the aforementioned two-password system according to the present invention, the process of creating a symbol group for inputting a two-password password and of displaying it to a user is preceded unlike the conventional password system. Moreover, the authenticating process based on the matched symbol group MSG is quite different from the conventional password system, which will be described below in detail.

Subsequently, a concrete embodiment of a user interface 20 according to a main system 40 will now be described with reference to the accompanying drawings, especially FIG. 10 to FIG. 18.

Figure 10:
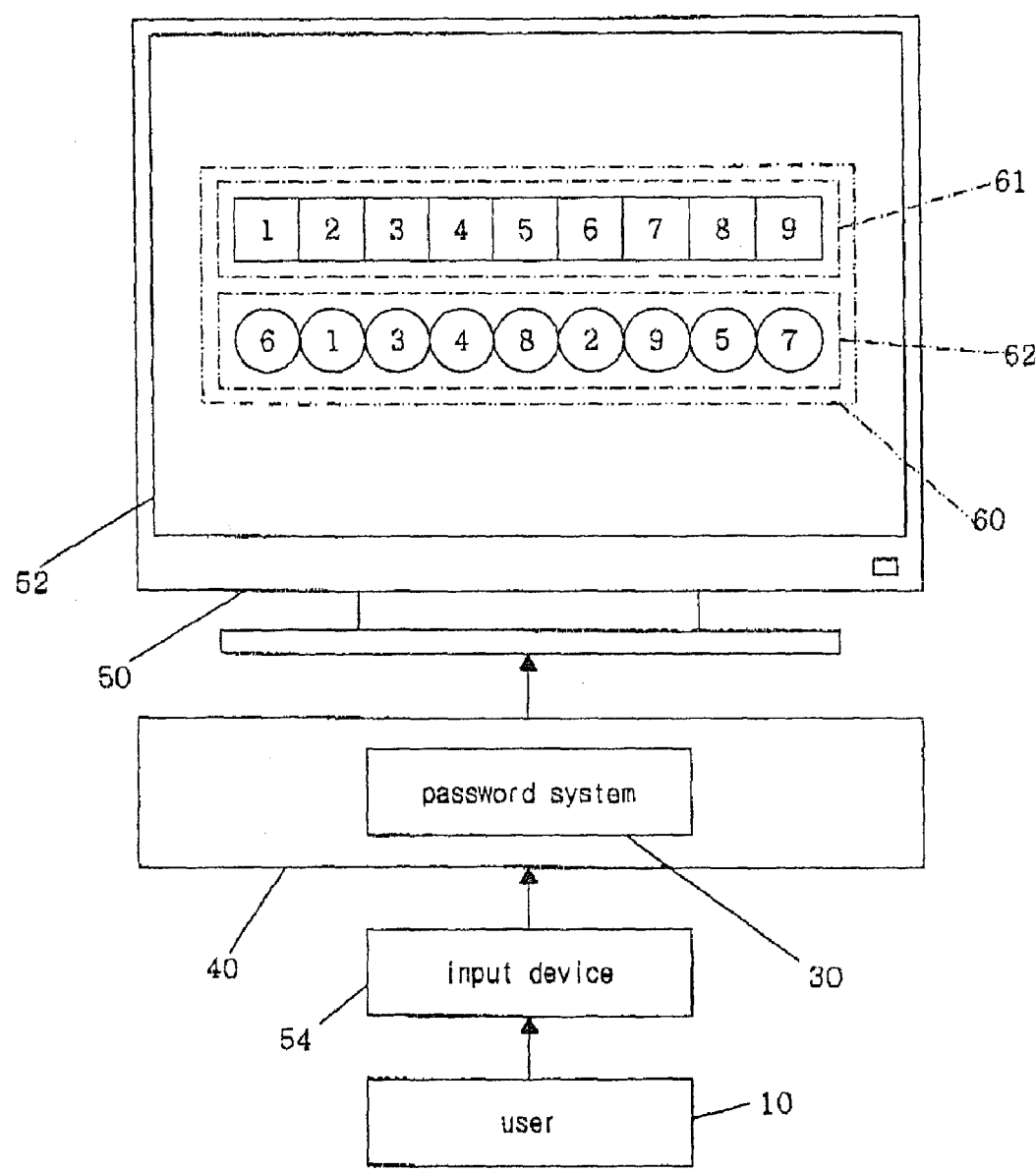
FIG. 10 illustrates a preferred embodiment of a user interface according to a main system.
Figure 11A:
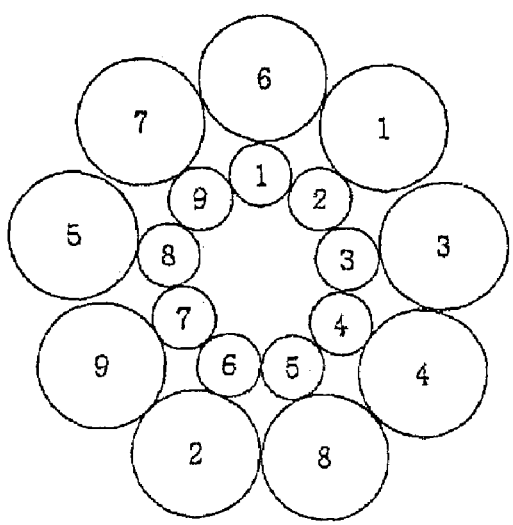
FIG. 11a to FIG. 11d illustrate various modifications of a symbol board.
Figure 11B:
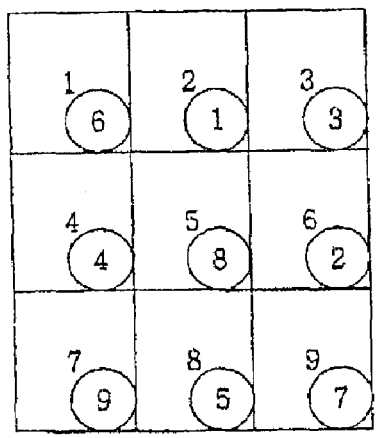
Figure 11C:
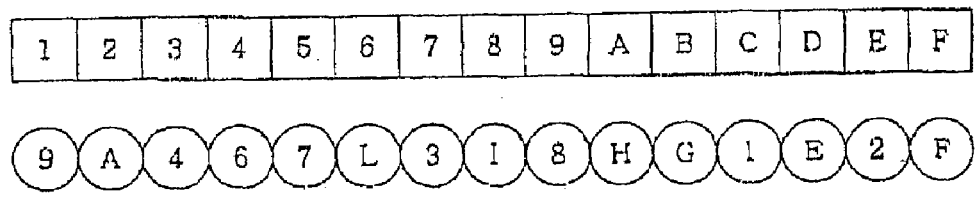
Figure 11D:
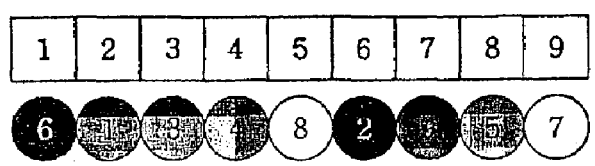

FIG. 10 illustrates a preferred embodiment of a user interface according to a main system. The two-password system 20 may be built in a system with a graphic user interface, for example, a main system 40, such as a personal computer system, a PDA, an ATM banking terminal or the like. At this point, the user interface 20 may be composed of a display unit 50, such as a CRT display unit, a liquid crystal display unit or the like, as display means 22, and a graphic user interface 60 displayed on the display unit, or an input device 54, such as a keyboard device, a pointing device or the like, as the matching means 24, or the combination thereof.

The graphic user interface 60 displayed on the screen 52 of the display unit 50 includes a first symbol board 61 for indicating RMS and VMS, and a second symbol board 62 for indicating RPS and VPS. The first symbol board 61 and the second symbol board 62 are called a matching symbol board and a password symbol board, respectively. The user 10 uses the input device 54 to input the two-password set. According to the control of the user 10, the symbols arranged on the matching symbol board 61 and/or the password symbol board 62 are shifted in circulation and then displayed.

A method for shifting the symbols in circulation and displaying them is one wherein the matching symbol board 61 is displayed fixedly, and the password symbol board 62 is shifted to the right or to the left in circulation and then displayed. Since the symbol array arranged on the matching symbol board 61 is a standard for matching, the sequence of arrangement is displayed fixedly so that the RMS can be found rapidly. If there is sufficient complexity for the user to find the RMS, it may be possible to display randomly the sequence of arrangement of the symbols of the matching symbol board 61 in irregular order. It is preferable that the symbols arranged on the password symbol board 62 be displayed randomly.

Another method for shifting the symbols in circulation and displaying them is one wherein the matching symbol board 61 and the password symbol board 62 are shifted in opposite directions relative to each other. Alternatively, it may be considered that the matching symbol board 61 is displayed fixedly, and each number arranged on the password symbol board 62 is displayed in circulation while it is increased or decreased upward or downward at its original place.

In addition to the aforesaid methods for shifting the symbols in circulation and displaying them, various modifications or applications to the method may be possible, and thus it is understood that such modifications or applications are obvious to those skilled in the art on the basis of the present invention.

In the display form of the symbol group, not only are the matching symbol board 61 and the password symbol board 62 arranged in a single file, respectively, as shown in the drawings, but also other display forms may be realized. For example, forms of circle or matrix may be provided, as shown in FIG. 11*a* to FIG. 11*d*. Moreover, the arranged symbols may include characters, figures, pictures, or the combination thereof as well as numbers. That is to say, the symbols may be composed of any symbolized means, and any color may be added, which helps the user recognize the symbols more easily. For example, circles enclosing the numbers displayed on the password symbol board 62 may be displayed with different colors. Selection of the colors enables the user to recognize the symbols rapidly. Various applications to the method for displaying the symbol may be possible, and thus it is understood that such applications are obvious to those skilled in the art on the basis of the present invention disclosure.

Figure 12:
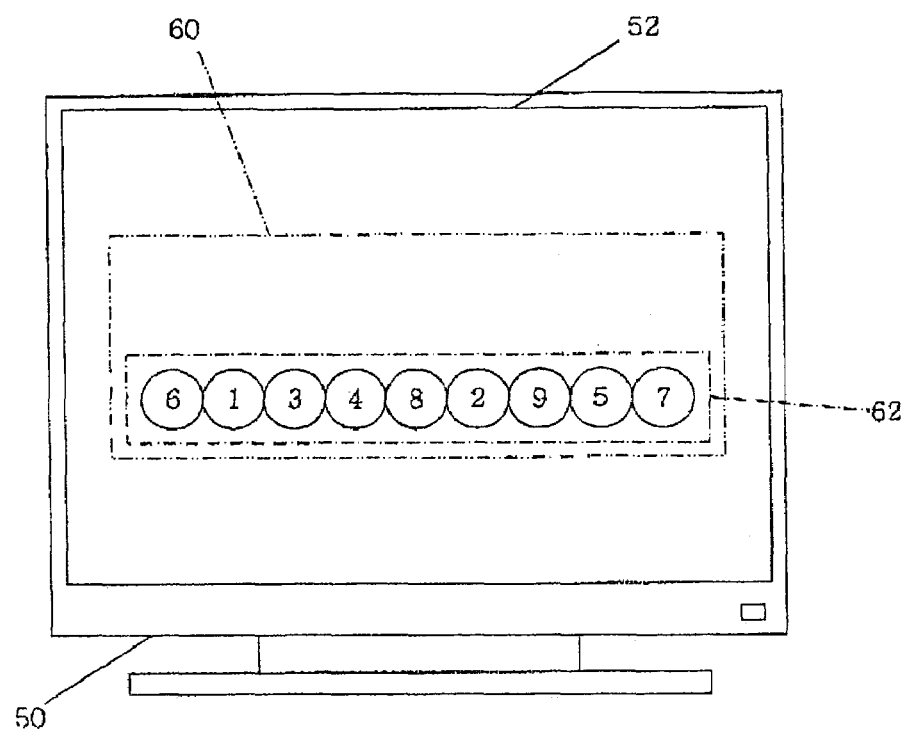
FIG. 12 illustrates a modification in which a first symbol board is omitted.
Figure 13:
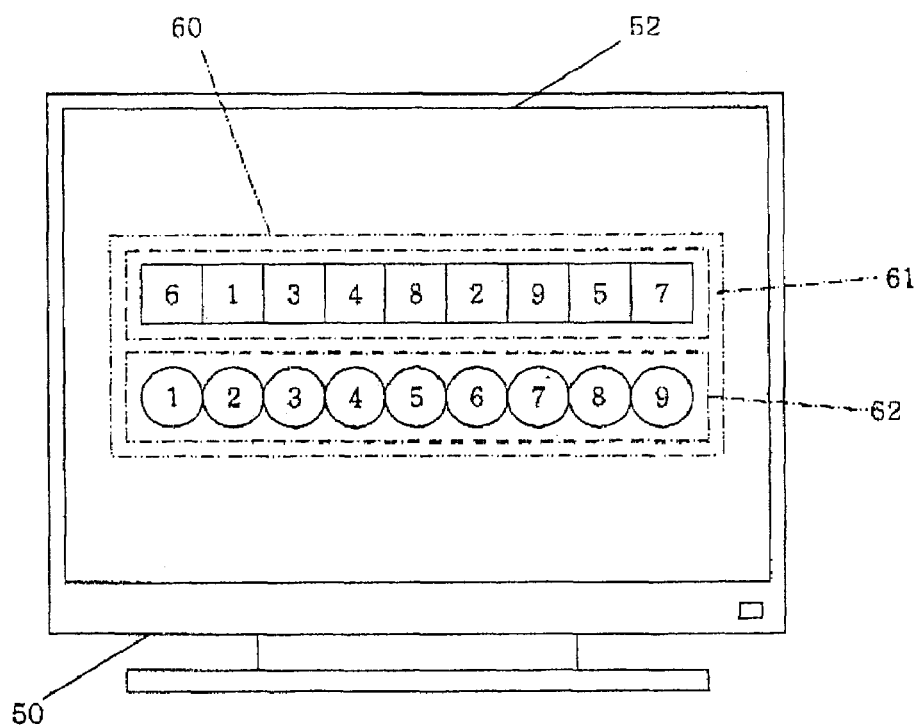
FIG. 13 illustrates another modification in which indication forms of first and second symbol boards are changed.

If one of the matching symbol board 61 and the password symbol board 62 is displayed fixedly so that the sequence of arrangement of the board is suggestive, its display may be omitted. For example, when the numbers 1 to 9 are arranged in sequence on the matching symbol board 61, the user can associate easily the matching symbol board 61, and thus its display may be omitted, as shown in FIG. 12.

Figure 14:
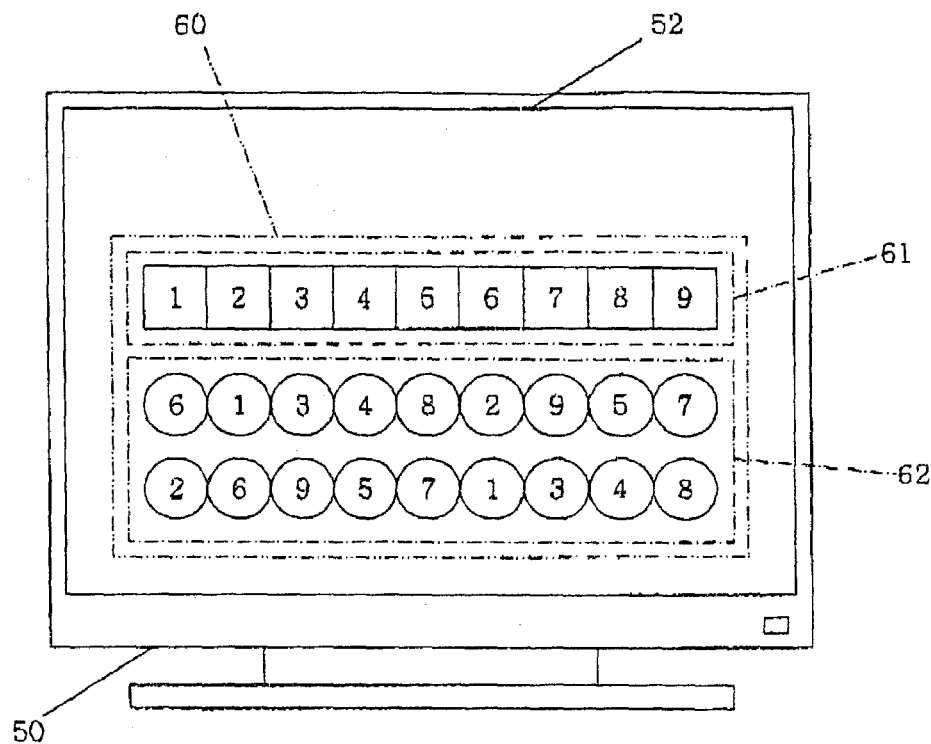
FIG. 14 illustrates still another modification in which several symbol arrays are displayed simultaneously on the second symbol board.

In another preferred embodiment, the matching symbol board 61 and the password symbol board 62 may be displayed in the form of mutual exchange. For example, the symbols arranged on the password symbol board 62 may be displayed in sequence, and the symbols arranged on the matching symbol board 61 may be displayed randomly. Alternatively, the password symbol board 62 may be displayed fixedly, and the matching symbol board 61 may be displayed in circulation under the control of the user. Such a change is obvious to those skilled in the art on the basis of the present invention disclosure. In still another preferred embodiment, at least two symbol arrays may be displayed simultaneously on the password symbol board 62, as shown in FIG. 14. A user can input a two-password set by matching the symbols on the matching symbol board 61 with the symbols on the password symbol board 62 in sequence using each symbol array displayed on the password symbol board 62. The number of the several symbol array displayed on the password symbol board 62 corresponds to the number of the RPSG.

Figure 15:
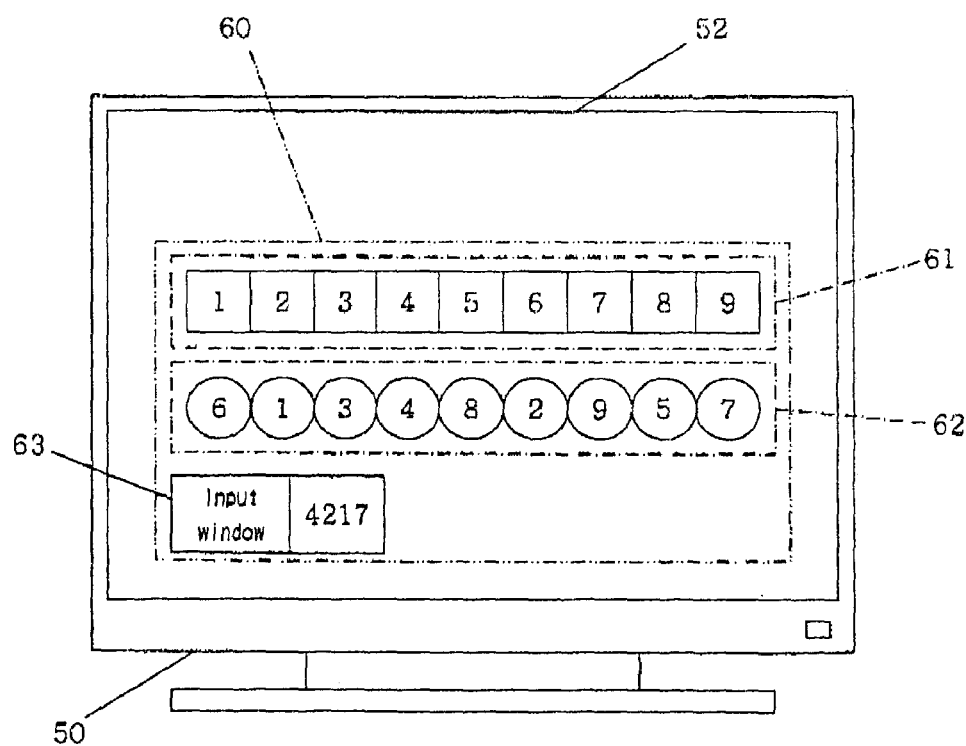
FIG. 15 illustrates an example of a graphic user interface providing an input window for inputting an amount of recurring movement of the symbol board for symbol matching.

Although the symbol array is shifted in circulation to match the symbols in the aforesaid embodiment, direct input of the amount of shifting the symbol array in circulation may be possible. As shown in FIG. 15, the graphic user interface 60 is provided with an additional input window 63 so that a user can input directly the amount of shift in circulation of the password symbol board 62. For example, if one RMS in the RMSG is '3' and the RPSG is '5618', the amounts of shift in circulation are 4 times, 2 times, 1 time, and 7 times, respectively when the numbers, '5', '6', '1', and '8' are shifted to the right in circulation on the basis of the number '3' displayed on the matching symbol board 61. Consequently, the number '4217' is inputted to the input window 63.

Figure 16:
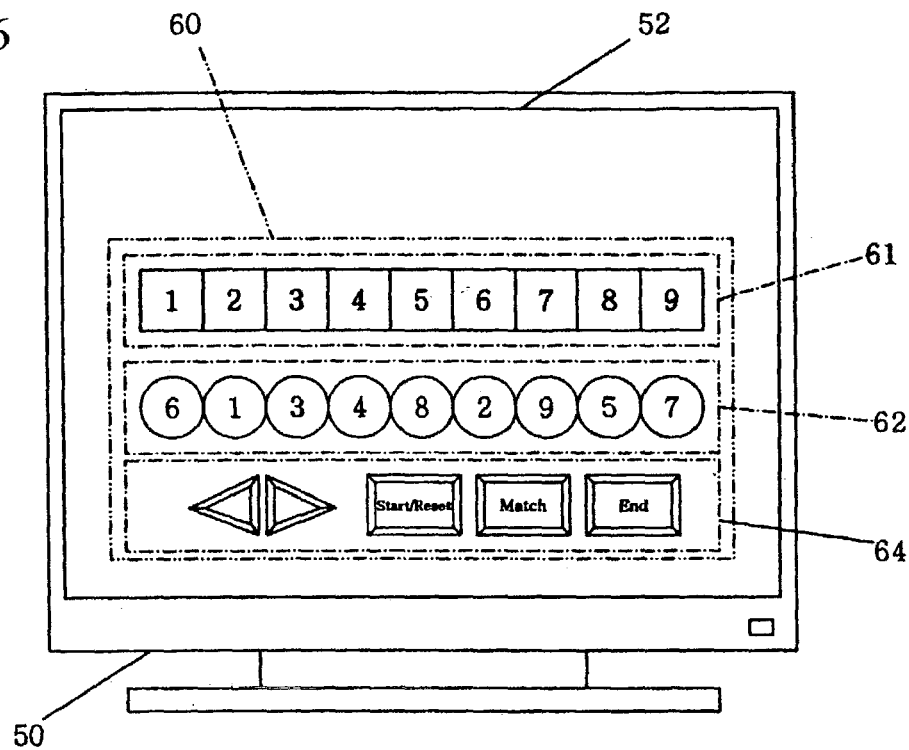
FIG. 16 illustrates an example of a graphic user interface including several input buttons for matching the symbol array recursively.

As shown FIG. 16, the graphic user interface 60 may be provided with a plurality of matching control buttons 64 for matching the symbol array in circulation. For example, the matching control button 64 includes a left and right circulating shift button, a start/reset button, a matching button, and an input completion button.

Figure 17:
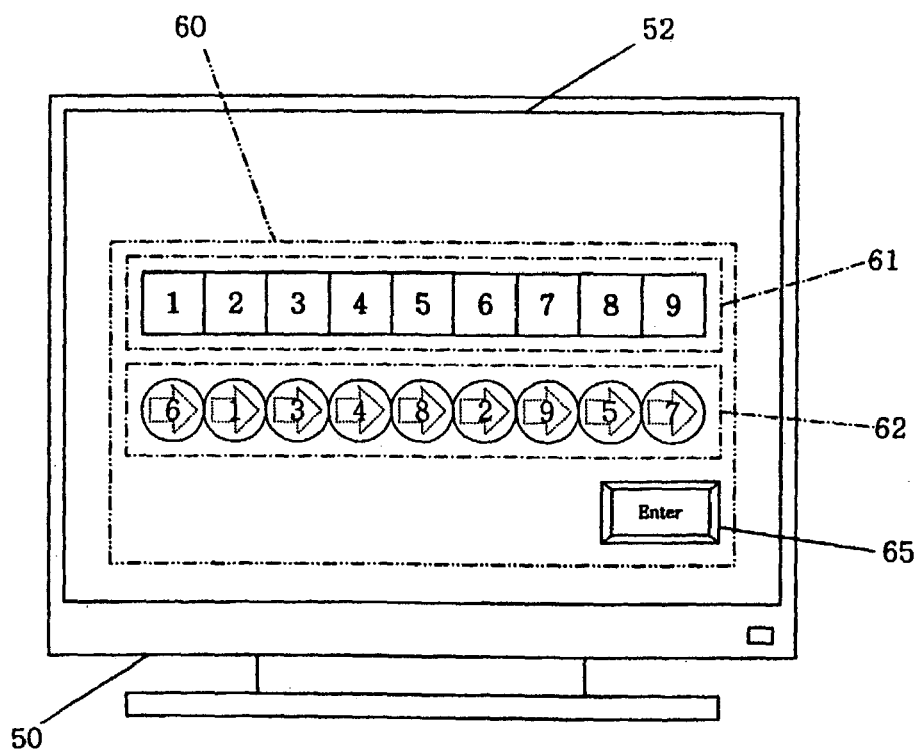
FIG. 17 illustrates an example of a graphic user interface where the symbol board is automatically recurring.

In another embodiment, it may be conceived that the matching symbol board 61 or the password symbol board 62 is circulated automatically, and a user inputs to inform that the RMS in the matching symbol board 61 and the RPS in the password symbol board 62 are matched with each other. For example, the user can input an enter button 65 displayed on the graphic user interface 60 or use the enter-key on the input device 54 to inform that the symbols have been matched when the password symbol board 62 is circulating automatically, as shown in FIG. 17.

The graphic user interface is not limited by the embodiments as described above, and any combination of the embodiments can be used. Moreover, the number of the symbols arranged on the matching symbol board 61 and the password symbol board 62 may be set to a desired number considering the user's situation and security. For example, in case that high security is required, the number of the symbols arranged on the board may be increased. In case that rapid inputting and handling of a password are required, the number of the symbols arranged on the board may be decreased.

Figure 18:
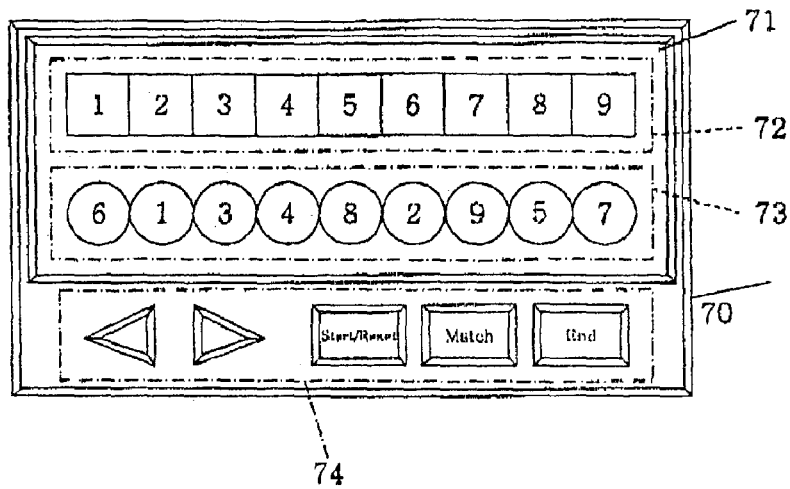
FIG. 18 illustrates an example of a user interface for a door lock system with a two-password system according to the present invention.
Figure 19:
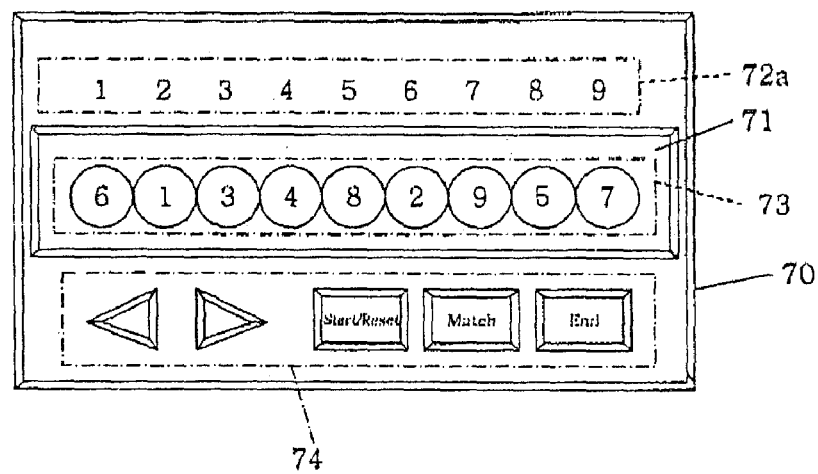
FIG. 19 illustrates a modification in which only one of the symbol boards is displayed.
Figure 20:
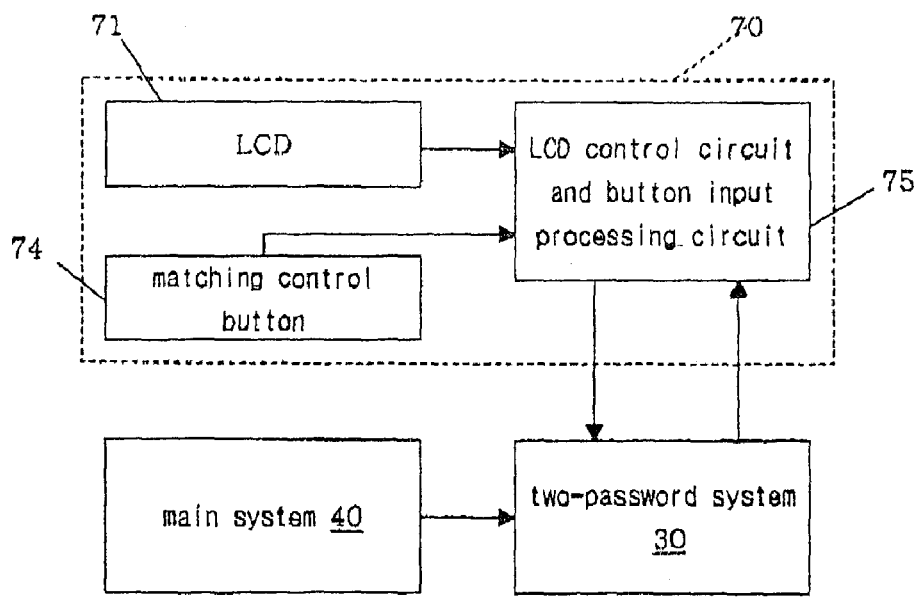
FIG. 20 illustrates an example of circuit formation of the user interface of FIG. 18.

The two-password system according to the present invention may be built in a system with a mechanical mechanism and a related electronic circuit, for example, a locking system such as an electric door lock, or an entrance control system. The two-password system may cooperate with the mechanical mechanism and the electronic circuit built in the main system. In this case, the user interface may be constructed as follows:

FIG. 18 illustrates an example of a user interface of the two-password system linked with an electronic circuit, FIG. 19 illustrates a modification in which only one of the symbol boards is displayed, and FIG. 20 illustrates an example of circuit formation of the user interface of FIG. 18.

Referring to the drawings, a password input panel 70 is provided as a user interface for inputting a two-password set of the main system, such as an electrical door lock or an entrance control system. The password input panel 70 includes an LCD 71 as display means for displaying the symbol group. On the LCD 71 is displayed an image of the matching symbol board 72 for displaying the RMS and the VMS and an image of the password symbol board 73 for displaying the RPS and the VPS. As shown in FIG. 19, however, only the password symbol board 73 may be displayed on the LCD 71, and the password input panel 70 is provided at the front upper part thereof with a display area 72a for displaying the matching symbol board so that the symbols are indicated on the display area. As the matching means, the password input panel 70 is provided at the front part thereof with a plurality of matching control button 74. The matching control button 74 includes a left and right circulating shift button, a start/reset button, a matching button, and an input completion button.

The password input panel 70 includes an LCD control circuit and a button input processing circuit 75, so that it displays the matching symbol board 72 and the password symbol board 73 on the LCD 71 in response to a display control signal supplied by the two-password system 30. The user inputs a two-password set using the matching control button 74. The LCD control circuit and the button input sensing circuit 75 receive the input of the matching control button 74, and supply it to the two-password system 30.

Figure 21:
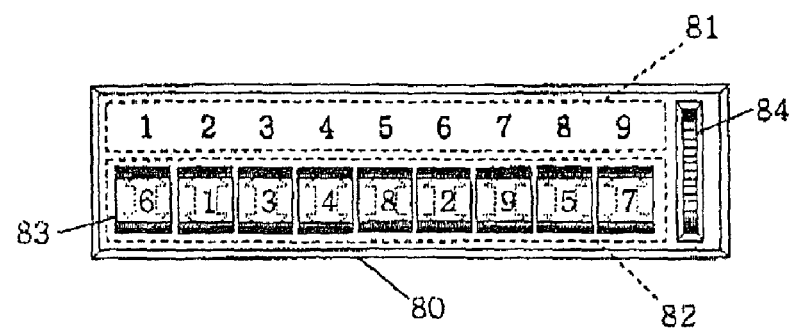
FIG. 21 illustrates an example of a user interface of the two-password system linked with a mechanical mechanism.
Figure 22:
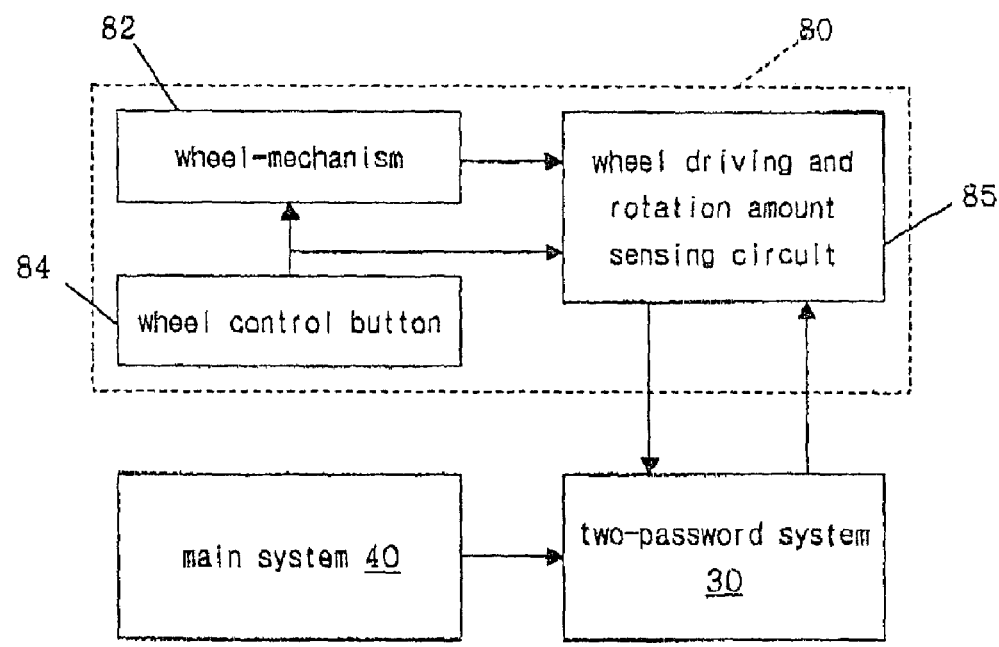
FIG. 22 illustrates an example of circuit formation of the user interface of FIG. 21.

FIG. 21 illustrates an example of a user interface of the two-password system linked with a mechanical mechanism, and FIG. 22 illustrates an example of circuit formation of the user interface of FIG. 21.

Referring to the drawings, a password input panel 80 is provided at the front upper part thereof with a display area 81 for displaying the matching symbol board so that symbols representative of the RMS and the VMS can be displayed. The password symbol board for displaying the RPS and the VPS comprises a wheel-mechanism 82 with a plurality of wheels 83. On each of the wheels 83 is printed a plurality of symbols in circulation.

The password input panel 80 includes a wheel driving and rotation amount sensing circuit 85 so that the panel drive the wheel-mechanism 82 in response to the display control signal supplied from the two-password system 30. The user inputs a two-password set using the wheel control button 74. The wheel control button 74 has such a structure that the wheel for rotating above and below the wheel-mechanism 82 and the button for generating the matching input signal are combined. The wheel driving and rotation amount sensing circuit 85 receives the input of the wheel control button 84, and supplies it to the two-password system 30.

The user interface of the two-password system using such a wheel mechanism 82 may be realized by the aforesaid graphic user interface. That is to say, while the matching symbol board and/or the password symbol board are displayed as the graphic user interface, upward and downward circulating shift may be realized. At this time, the control of the upward and downward circulating shift may be made using an additional wheel control button displayed on the input device or the screen.

As described above in detail, the user interface for inputting a two-password set of the two-password system according to the present invention can be constructed in various ways in accordance to the characteristic of the main system 30. It will be obvious to those skilled in the art that any password input system accomplished by symbol matching can be employed on the basis of other different user interface systems, which are not mentioned herein, provided that they are based on the present invention.

4. Authenticating Process of a Two-password System

Detailed description will now be given of the authenticating process of the two-password system, which was described roughly with reference to FIG. 8 and FIG. 9.

Referring to FIG. 8 and FIG. 9, the symbol creating means 32 creates the symbol group to be displayed on the display means 22 at Step S10 of the two-password authenticating process. The symbol creating means 32 may create the symbols arranged on the matching symbol board and the password symbol board in such a manner that the symbols are created randomly or sequentially, or in such a manner that the symbols are created partially at random and partially in sequence.

For example, the symbols to be arranged on the matching symbol board may be created in a prescribed order, and the symbols to be arranged on the password symbol board may be created randomly. In addition, all of the symbols to be arranged on the matching symbol board and the password symbol board may be created only randomly. Alternatively, the symbols to be arranged on the password symbol board may be created randomly, and the symbols to be arranged on the matching symbol board may be created by shifting the sequence of the symbols arranged on the password symbol board.

In another example, the RMSG and the RPSG are derived on the basis of the authenticating reference information 36 stored in the memory 35, and the sequence of arrangement of the symbols is decided. At this time, a user may set the sequence of arrangement of the symbols to an order in which it is convenient for the user to input a two-password. For example, the sequence of arrangement of the symbols may be decided so that the number of rotation of the password symbol board is within a prescribed range.

Figure 23:
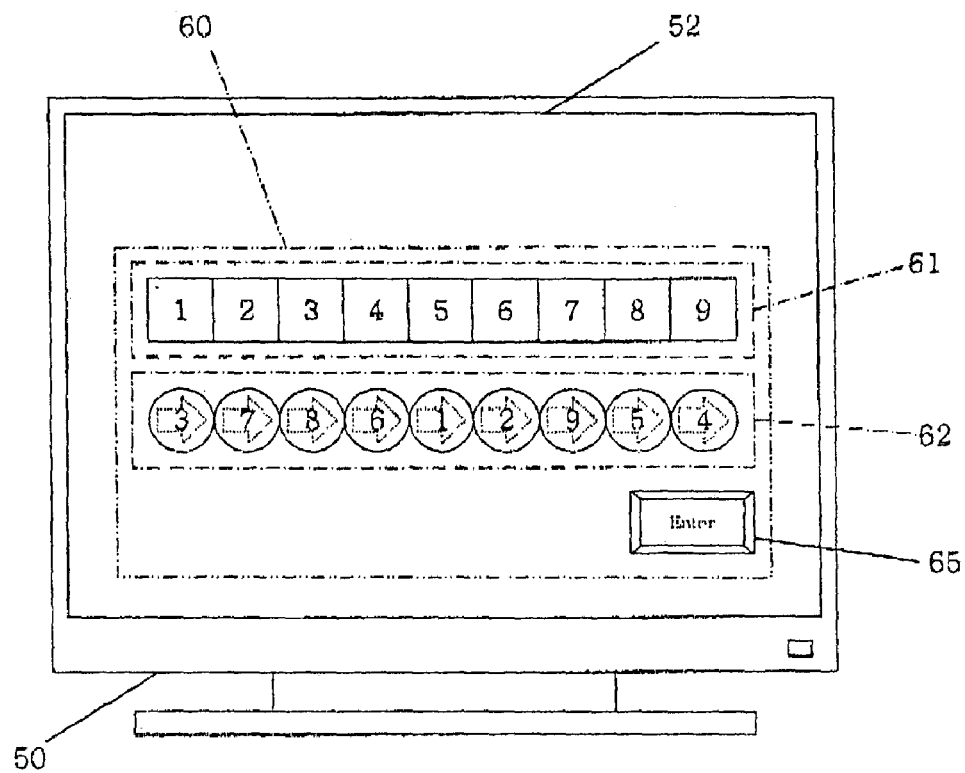
FIG. 23 illustrates an example of a symbol array for putting the number of rotations of a password symbol board within a prescribed range.
Figure 24A:
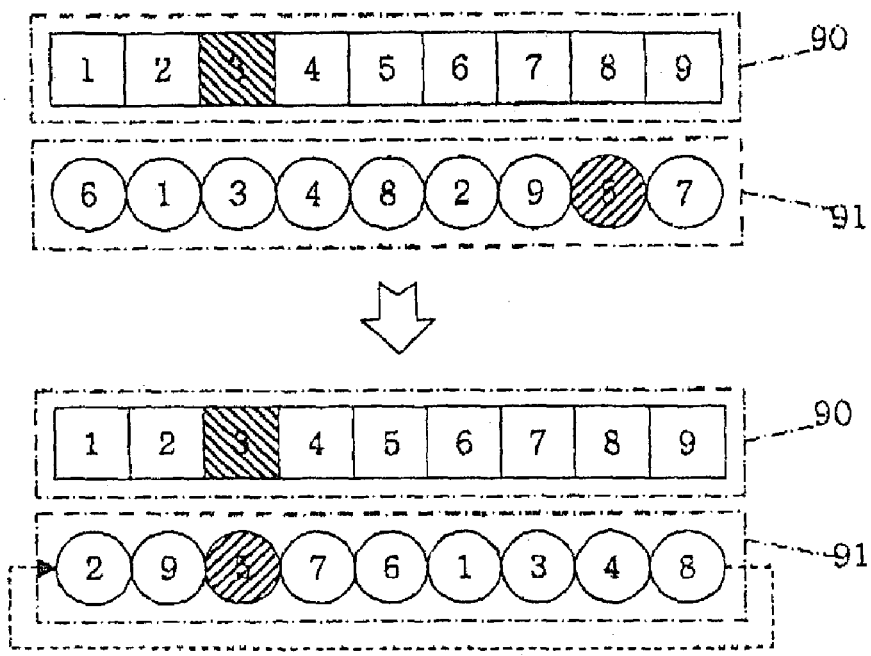
FIG. 24a to FIG. 24d are schematic views for explaining an example of a matched symbol group.
Figure 24B:
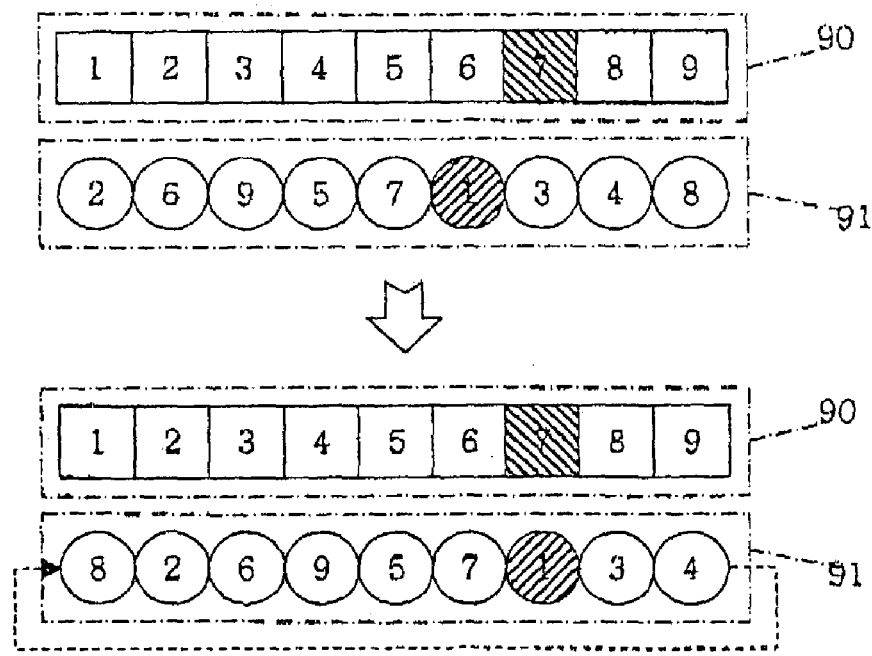
Figure 24C:
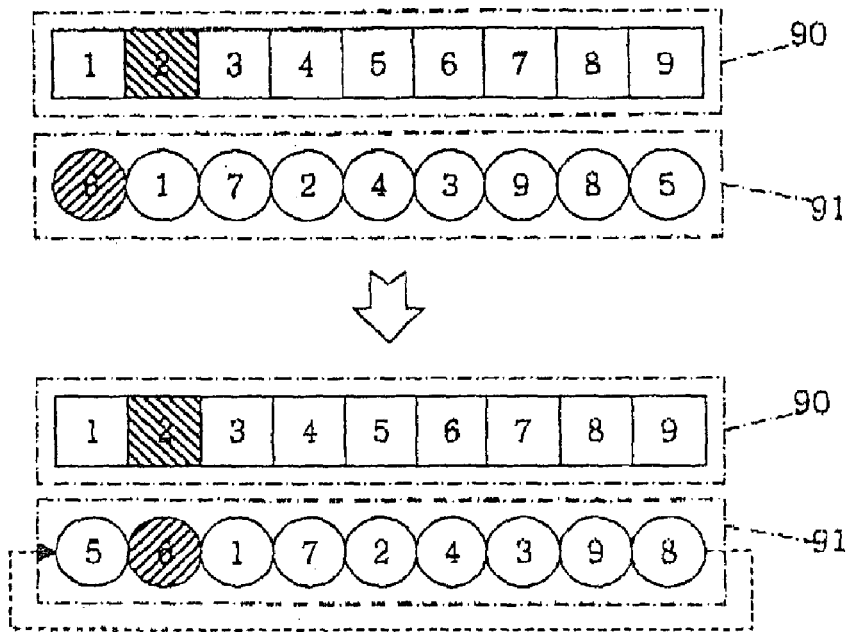
Figure 24D:
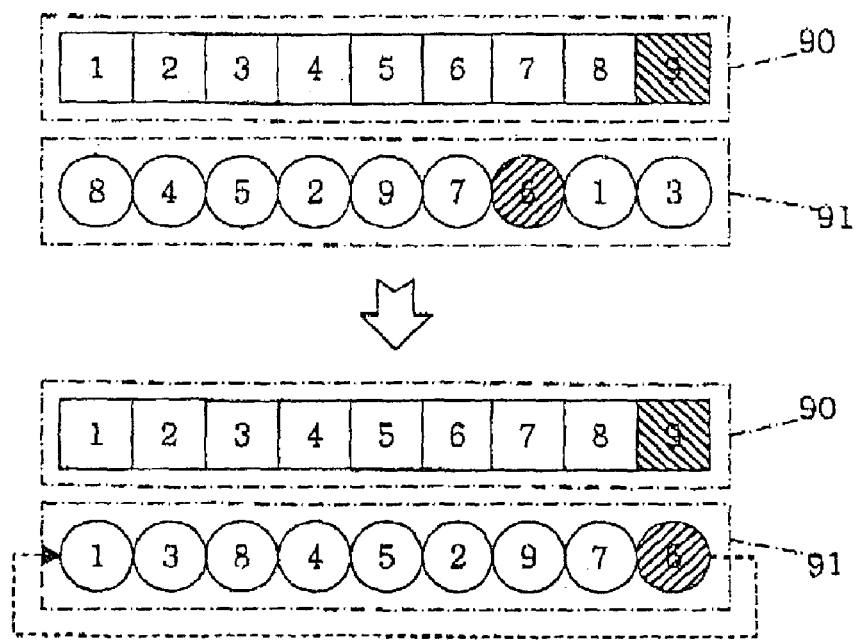

FIG. 23 illustrates an example of a symbol array for putting the number of rotation of a password symbol board within a prescribed range.

When the password symbol board 62 is shifted automatically to the right in circulation, the two-password is '134672'. When the RMSG is '147' and the RPSG is '362', the symbol arranged on the password symbol board 62 is created with '378612954'. In addition, after three times of the symbol matching, the symbols on the password symbol board 62 are arranged in the same sequence. In that case, the numbers '1' and '3' and the numbers '4' and '6' are already matched at an initial display state, and thus the numbers '1' and '3', and the numbers '4' and '6' are matched by inputting the enter button 65 two times. After that, if the password symbol board 65 is shifted once to the right, the numbers '7' and '2' are matched. At that point, the enter button 65 is pressed. In this way, the sequence of arrangement of the symbols may be decided for convenience of the user.

However, the case must be excluded in that no circulating shift of the symbols is made in all symbol matching. If all symbol matching is made only by pressing the enter button 65, the security may be vulnerable. Consequently, the circulating shift must be accomplished at least one time considering the security. That is to say, the arrangement of the symbols must be made for ensuring the security while excessive circulating shifts are avoided. Here, it is of importance to provide the maximum input convenience when the user inputs the two-password.

On the other hand, the authenticating process of the two-password system may include the step of inputting a peculiar ID given to the user together with inputting of the two-password. For example, when the main system 40 is a system having several users, it is further required to input the ID of the user, which will be described later. In the authenticating process in which the user further inputs his or her ID, the authenticating reference information 36 may be derived from the memory 35 using the inputted ID so that the aforesaid symbol creating step is carried out.

The process of creating the symbol group by deciding the sequence of arrangement of the symbols as mentioned above may be carried out either only once in the course of inputting the two-password or repetitively every symbol matching.

The symbol group created as described above is provided to the display control means 31, which outputs the created symbol group to the display means 22 at Step S20. The display means 20 displays the symbol group under the control of the display control means 31. A method for displaying the symbol group is one of various embodiments of the user interface for inputting the two-password as mentioned above.

The user 10 matches the symbols displayed on the display means 22 using the matching means 24 at Step S30. The matching symbol processing means 33 creates the symbol group matched on the basis of the user's input by the matching means 24 at Step S40. Examples of the created MSG will now be described with reference to the accompanying drawings, especially FIG. 24a to FIG. 24d.

In the drawings, the symbols indicated especially by hatching in the matching symbol board 90 and in the password symbol board 91 are provided only for the purpose of better understanding of the detailed description. The aforesaid symbols are displayed in the same forms as the other symbols in a real user interface.

Figures 25, 26:
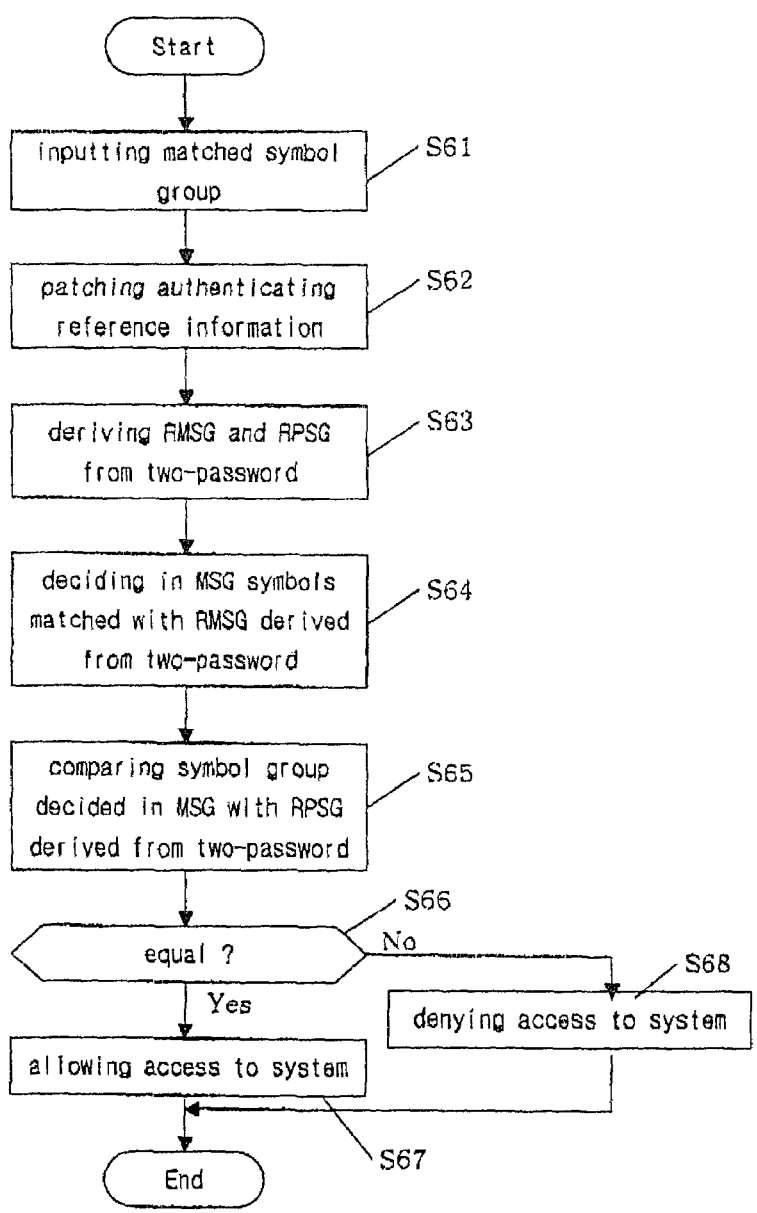
FIG. 25 is a table showing the matched symbol group of FIG. 24a to FIG. 24d.
FIG. 26 is a flowchart showing a concrete process of a password authenticating procedure.
Figure 27:
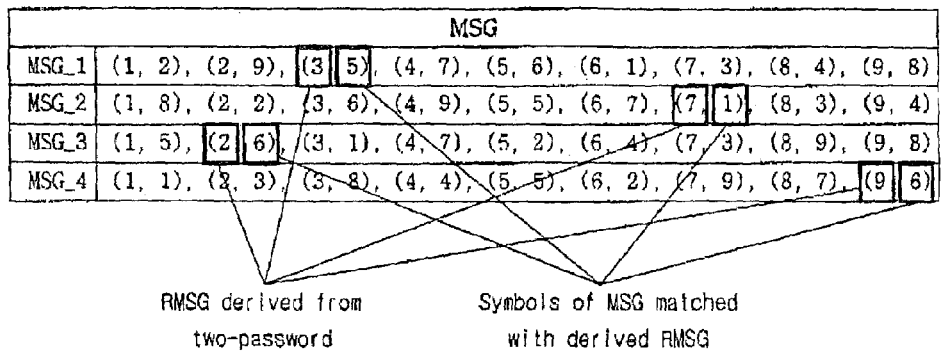
FIG. 27 illustrates symbols of the MSG matched with the RMSG derived from the two-password system.

When the RMS are '3', '7', '2', and '9', and the RPS are '5', '1', '6', and '6', the user matches the numbers '3' and '5', '7' and '1', '2' and '6', and '9' and '6' on the matching symbol board 90 and the password symbol board 91 in sequence at every matching steps, as shown in the drawings. At this time, the created MSG is as shown in FIG. 25. The MSG created at every steps, MSG_1~MSG_4, are inputted to the authentication processing means 34 at Step S50.

When the sequence of the symbols arranged on the matching symbol board 90 is fixed, only the symbols arranged on the password symbol board 91 at the time of matching can be transmitted to the authentication processing means 34. Here, it is possible that all of the information about the symbols arranged on the password symbol board 91 is transmitted at the time of the first matching, and only the information about how many times the password symbol board 91 is rotated from after the matching is carried out a second time. In addition, when the sequence of the symbols arranged on the matching symbol board 90 is not fixed, all symbols on the matching symbol board 90 and the password symbol board 91 can be transmitted in regular sequence at the time of matching.

Various modifications or applications of the information transmitted to the authentication processing means 34 may be possible in accordance with the characteristic of the user interface, and thus it is understood that such modifications or applications are obvious to those skilled in the art on the basis of the present invention disclosure. Furthermore, the transmission to the authentication processing means 34 may be made either only once at the time that inputting of all of the two-password sets has been completed, or every time that one matching has been accomplished.

The authentication processing means 34 carries out a prescribed password authenticating process on the basis of the authenticating reference information 36 stored in the memory 35 at Step S60. A flowchart showing a concrete process of a password authenticating procedure is shown in FIG. 26.

Referring to FIG. 26, the MSG is inputted to the authentication processing means 34 at Step S61. The authenticating reference information 36 is patched from the memory 35 at Step S62. In this embodiment, the authenticating reference information is a two-password set. The RMSG and the RPSG are derived from the two-password as Step S63. The symbols to be matched with the RMSG derived from the two-password are decided by the MSG at Step S64. For example, if the RMSG is '3729', the symbols of the MSG to be matched with the number will be '5', '1', '6', and '6'.

The symbol group decided in the MSG is compared with the RPSG derived from the two-password set at Step S65, and it is determined whether the two symbols accord with each other at Step S66. If the two symbols are the same, access to the system is allowed at Step S67. If the two symbols are not the same, access to the system is denied at Step S68.

Although the authenticating reference information 35 stored in the memory 35 is a two-password set as in the aforementioned examples, it may be divided into the RMSG and the RPSG, both of which are stored respectively or only one of which is stored. If one of the RMSG and the RPSG is stored, one of the two is derived from the other of the two. For example, when the RMSG and the RPSG are constructed as shown in FIG. 5, the RMSG is stored and the RPSG is derived from the former. When the user's ID is inputted in the authenticating process, the authenticating reference information 36 is patched from the memory 35 on the basis of the inputted ID, which will be described later.

Figure 28:
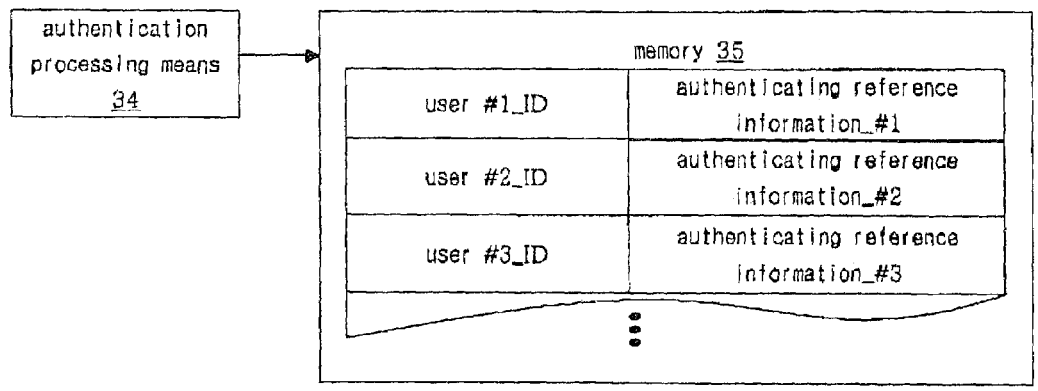
FIG. 28 and FIG. 29 illustrate examples of authenticating reference information stored in a memory.

The aforesaid authenticating process of the two-password system is an example applicable to a single-user system. In the case of a multi-user system, the step for inputting the user's ID together with inputting of the two-password is further included. As shown in FIG. 28, the authentication processing means 34 patches the authenticating reference information stored in the memory 35 on the basis of the inputted user's ID.

Figure 29:
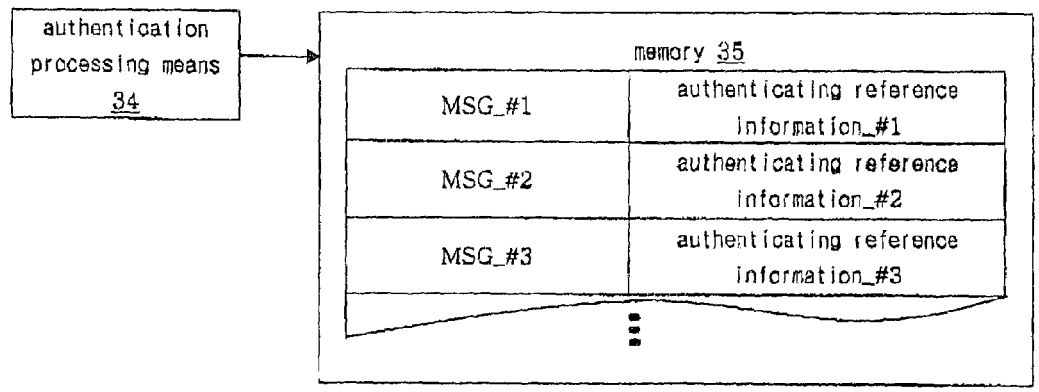

In the multi-user system, the authenticating process may be executed without further inputting the user's ID. For example, the inputted MSG may be utilized as index, as shown in FIG. 29. Here, the symbol creating means 32 patches the authenticating reference information using the MSG. Although inputting the user's ID is to input directly using the input device, it is also possible to use the button on the graphic user interface. Besides, inputting the user's ID may be included even in the single-user system.

5. Applications of the Two-password System

The two-password system according to the present invention is applicable to any system requiring a password input. For example, applications of the two-password system includes a personal computer system, a locking system, an ATM banking terminal, a PDA, a cellular phone, an internet banking system, a cyber trading system or the like.

Figure 30:
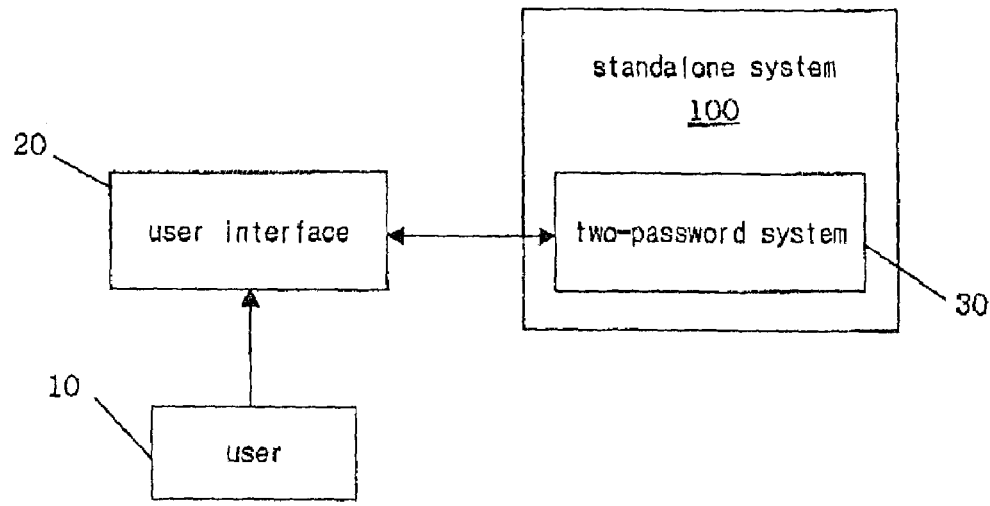
FIG. 30 illustrates an example of a standalone system with a two-password system according to the present invention.

An example of a standalone system 100 with a two-password system 30 according to the present invention is shown in FIG. 30. The user interface of the two-password system 30 built in the standalone system 100 may be equipped inside the system or outside the system. In a personal computer system, for example, the graphic user interface, the input device, or the combination thereof may be possible as in the aforesaid example.

Figure 31:
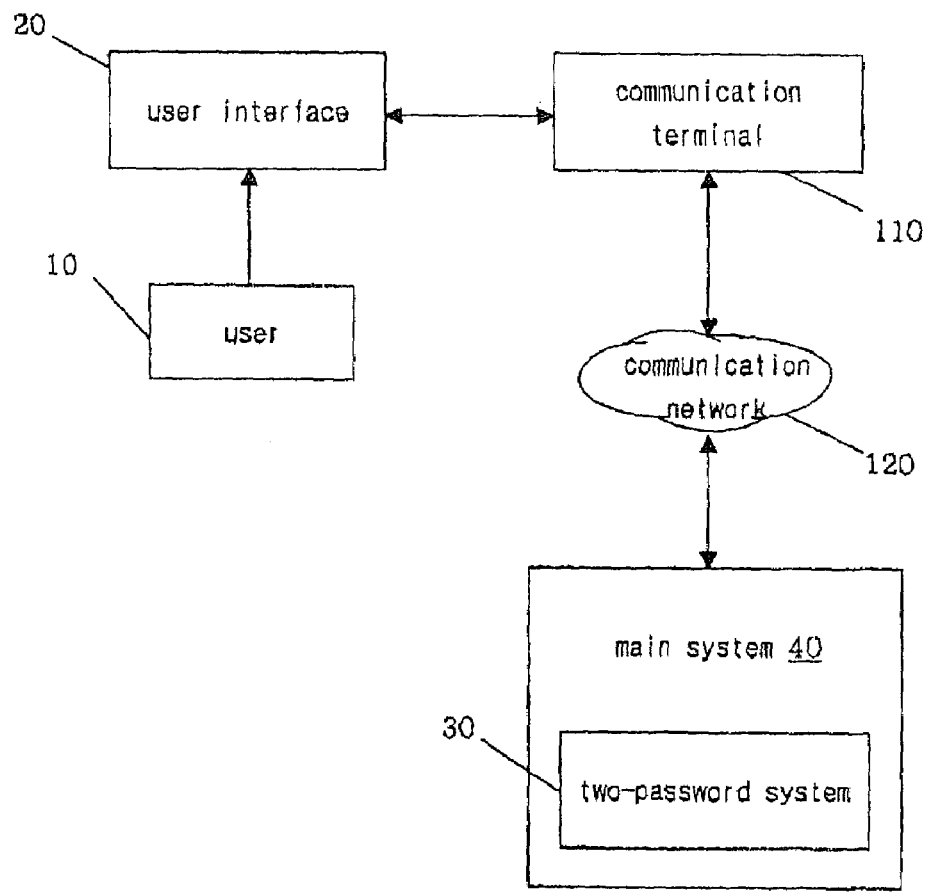
FIG. 31 illustrates an example of a main system with a two-password system according to the present invention in a network.
Figure 32:
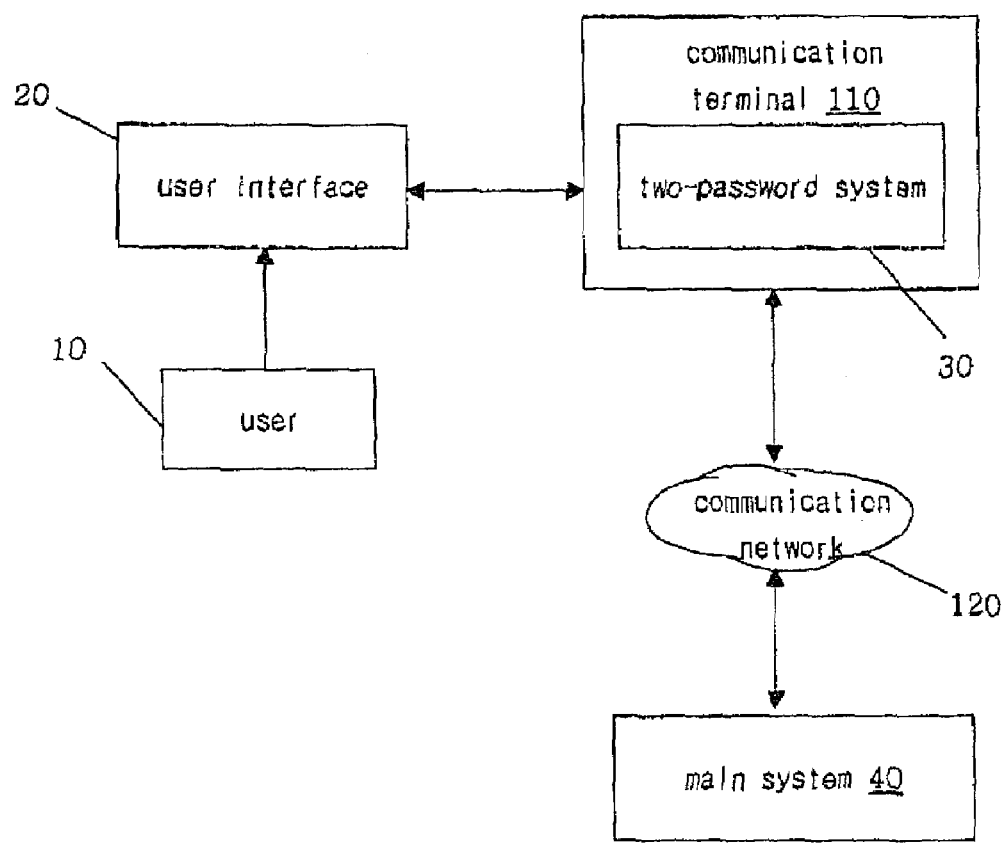
FIG. 32 illustrates an example of a communication terminal with a two-password system according to the present invention in a network.

FIG. 31 illustrates an example of a main system with a two-password system according to the present invention in a network, and FIG. 32 illustrates an example of a communication terminal with a two-password system according to the present invention in a network.

The two-password system according to the present invention may be used in a network. The two-password system is built in the main system connected via a communication network 120 as shown in FIG. 31. A communication terminal 110 receives information about the symbol group from the main system 40 through the communication network 120, and displays it through the user interface 20. The user inputs a two-password set using the user interface 20. The information generated by input of the two-password set, such as the matched symbol group MSG, is inputted to the two-password system 30 built in the main system 40 via the communication network 120 by means of the communication terminal 110. Alternatively, in the case of the information being transmitted from the communication terminal 110 to the main system 40, only the amount of shift of the symbol array in circulation may be transmitted at the time of symbol matching.

The transmitted information may be encoded as necessary, or combined with security platforms, such as a public key-based structure. In this case, the transmitted information may include information of the user's ID. When the MSG further includes the index function as in the aforesaid example, i.e., when the user's ID is displayed, only the MSG can be transmitted, although other various applications are possible.

On the other hand, when the user's ID is stored in the communication terminal 110, the user inputs only a two-password set and any additional input of the ID may be omitted. At this time, the two-password system 30 built in the main system 40 patches not only the two-password set or the real symbol group and the password symbol group from the memory, but also uses the user's ID provided from the communication terminal 110.

Another embodiment of the two-password system 30 may be built in the communication terminal 110, as shown in FIG. 32. In this case, the authenticating process is carried out in the communication terminal 110.

As described above in detail, the two-password system 30 of the present invention is connected with the user interface 20, as shown in FIG. 8, and built in the standalone system 100. Alternatively, the two-password system 30 may be built in the main system 49 or the communication terminal 110 connected with each other via various kinds of the communication network 120, such as a cable network, a wireless network, a computer network. In addition, some components of the two-password system may be separable. For example, the memory 35 for storing the authenticating reference information may be disposed in the communication terminal 110 or the main system 40.

Examples of symbol matching have been described in the aforementioned embodiments, although a picture may be completed like a puzzle or special numbers may be prepared to input the two-password.

As described above in detail, the construction and operation of the two-password system according to the present invention have been described on the basis of several specific embodiments, which are provided for illustrative purposes only. Therefore, it will be obvious to those skilled in the art that various changes and modifications may be made without departing from the spirit of the invention. It will also be obvious to those skilled in the art that the aforesaid embodiments of the present invention may be realized in the in association with one another.

With the two-password system according to the present invention, a password is not revealed to any person observing the course of inputting the password. In other words, a user matches a real matching symbol and a real password symbol to a password, which is only known to the user. At this time, several virtual matching symbols and virtual password symbols are matched simultaneously. As a result, it is not possible for an observer to distinguish which of the symbol matching is the one for inputting the password. Consequently, the present invention is capable of preventing a password from being revealed to any person observing the course of inputting the password so that a feeling of uneasiness given to a user is eliminated and security of the system is improved.

What is claimed is:

1. A password system comprising:

display means for displaying a matching symbol board on which there are arranged and displayed a plurality of symbols including a real matching symbol, which is a standard of matching, and several virtual matching symbols, which are provided for concealing the real matching symbol, and a password symbol board on which there are arranged and displayed a plurality of symbols including a real password symbol, which is to be matched with the real matching symbol, and several virtual password symbols, which are provided for concealing the real password symbol;

symbol creating means for creating symbol groups to be displayed on the matching symbol board and the password symbol board;

display control means for receiving information about the symbol groups created by the symbol creating means, and for arranging and displaying the received information on the matching symbol board and the password symbol board;

matching means for matching the real matching symbol and the real password symbol;

matching symbol processing means for creating a matched symbol group when several symbols arranged on the matching symbol board and the password symbol board are matched by means of the matching means, and for outputting the matched symbol group;

a memory for storing authenticating reference information; and authentication processing means for receiving the matched symbol group outputted by the matching symbol processing means, and for allowing or denying a user access to a main system by determining whether the real password symbol is matched with the real matching symbol included in the matched symbol group inputted on the basis of the authenticating reference information.

2. The password system as claimed in claim 1, wherein the symbols arranged on the matching symbol board and the password symbol board include at least one of numbers, characters, figures, pictures, and a combination thereof.

3. The password system as claimed in claim 2, wherein the symbols arranged on the matching symbol board and the password symbol board include at least two different colors.

4. The password system as claimed in claim 1, wherein the symbol creating means creates symbols in the symbol group with the symbols arranged on the matching symbol board and the password symbol board.

5. The password system as claimed in claim 1, wherein the display control means does not display the matching symbol board but dose display the password symbol board, and wherein the user associates the symbols arranged on the matching symbol board to match the associated real matching symbol with the real password symbol.

6. The password system as claimed in claim 1, wherein at least one matching symbol board and at least one password symbol board are displayed simultaneously when several real matching symbols are matched with several real password symbols by at least one symbol matching.

7. The password system as claimed in claim 1, wherein the symbols arranged on one of the matching symbol board and the password symbol board are shifted in circulation so that the real matching symbol is matched with the real password symbol.

8. The password system as claimed in claim 7, wherein one of the matching symbol board and the password symbol board is circulated automatically.

9. The password system as claimed in claim 8, wherein an amount of circulating shift of said one of the matching symbol board and the password symbol board is inputted directly to match the real matching symbol with the real password symbol.

10. The password system as claimed in claim 1, wherein the matching symbol board and the password symbol board are displayed on the display means via a graphic user interface.

11. The password system as claimed in claim 1, wherein the display means includes a mechanical mechanism for displaying one of the matching symbol board and the password symbol board, and for displaying the arranged symbols in circulation.

12. The password system as claimed in claim 11, wherein the mechanical mechanism includes a plurality of wheels for displaying several symbols in circulation, and a wheel control button for controlling the wheels.

13. The password system as claimed in claim 1, wherein the symbol creating means creates randomly the sequence of the symbols arranged on at least one of the matching symbol board and the password symbol board.

14. The password system as claimed in claim 1, wherein a user's ID is inputted together with inputting of a password.

15. The password system as claimed in claim 1, wherein the symbol creating means creates a symbol group to be displayed on at least one of the matching symbol board and the password symbol board on the basis of the authenticating reference information, a sequence of arrangement of the symbols being decided so that minimum circulation is accomplished within a prescribed range when the user matches the real matching symbol with the real password symbol.

16. The password system as claimed in claim 1, wherein the symbol creating means patches the authenticating reference information on the basis of a user's ID.

17. The password system as claimed in claim 1, wherein the authentication processing means patches the authenticating reference information on the basis of any one of the matched symbol group and a user's ID.

18. The password system as claimed in claim 1, wherein the authenticating reference information stored in the memory is a group of real matching symbols and a group of real password symbols.

19. The password system as claimed in claim 18, wherein a derivable symbol group is stored as the authenticating reference information when one of the real matching symbol group and the real password symbol group is derived from another of the real matching symbol group and the real password symbol group.

20. The password system as claimed in claim 1, wherein the authenticating reference information stored in the memory is information that is capable of being used to derive one of the real matching symbol group and the real password symbol group.

21. The password system as claimed in claim 1, wherein the display means and the matching means are provided in a user interface of a communication terminal connected to a main system via a communication network.

22. The password system as claimed in claim 21, wherein the communication terminal transmits an amount of circulating shift of one of the matching symbol board and the password symbol board to the main system when the user's password is inputted, the transmitted information being encoded selectively.

23. The password system as claimed in claim 21, wherein the communication terminal has a user's ID, and wherein the authentication processing means patches the authenticating reference information on the basis of the user's ID.

24. A method for authenticating a user of a password system comprising the steps of:
   creating a first symbol group including a real matching symbol, which is a standard of matching, and several virtual matching symbols, which are provided for concealing the real matching symbol, and a second symbol group including a real password symbol, which is to be matched with the real matching symbol, and several virtual password symbols, which are provided for concealing the real password symbol;
   displaying a matching symbol board for displaying the first symbol group and a password symbol board for displaying the second symbol group by a display unit;
   inputting a two-password set by matching a real matching symbol of the matching symbol board and a real password symbol of the password symbol board by a means of matching means;
   creating a matched symbol group after the real matching symbol of the matching symbol board is matched with the real password symbol of the password symbol board, and inputting the matched symbol group to an authentication processing means; and
   processing an authentication for allowing or denying the user access to a main system on the basis of the authenticating reference information and the matched symbol group that has been created.

25. The method as claimed in claim 24, wherein one of the first symbol group and the second symbol group is arranged in a fixed sequence of arrangement and another of the first symbol group and the second symbol group is arranged randomly, a part of the step of creating the first symbol group and the second symbol group.

26. The method as claimed in claim 24, wherein the first symbol group and the second symbol group are arranged randomly a part of the step of creating the first symbol group and the second symbol group.

27. The method as claimed in any one of claims 25 and 26, wherein the step of creating the first symbol group and the second symbol group includes patching the authenticating reference information, and wherein at least one of the first symbol group and the second symbol group is created on the basis of the patched authenticating reference information, a sequence of arrangement of the symbols being decided so that circulation is accomplished within a prescribed range when the user matches the real matching symbol with the real password symbol.

28. The method as claimed in claim 24, further comprising the step of inputting a user's ID.

29. The method as claimed in claim 28, wherein the step of creating the first symbol group and the second symbol group includes patching the authenticating reference information on the inputted user's ID, and wherein at least one of the first symbol group and the second symbol group is created on the basis of the patched authenticating reference information, a sequence of arrangement of the symbols being decided so that circulation is accomplished within a prescribed range when the user matches the real matching symbol with the real password symbol.

30. The method as claimed in claim 24, wherein the step of processing the authentication comprises the steps of:
patching the authenticating reference information;
deriving the first symbol group and the second symbol group from the authenticating reference information;
determining the symbols to be matched with the derived first symbol group from the matched symbol group;
comparing the determined symbol with the derived first symbol group to obtain a result; and
selectively allowing or denying the user access to the main system on the basis of the result.

31. The method as claimed in claim 30, further comprising the step of inputting a user's ID, wherein the authenticating reference information is patched on the basis of the inputted user's ID in the step of processing the authentication.

32. The method as claimed in claim 30, wherein the authenticating reference information is patched on the basis of the matched symbol group in the step of processing of authentication.

33. The method as claimed in claim 30, wherein the real matching symbol is derived into '$X_1X_2X_3 \ldots X_{n-2}X_{n-1}X_n$', and the real password symbol is derived into '$Y_1Y_2Y_3 \ldots Y_{n-2}Y_{n-1}Y_n$' when the authenticating reference information is '$X_1Y_1X_2Y_2X_3Y_3 \ldots X_{n-2}Y_{n-2}X_{n-1}Y_{n-1}X_nY_n$' in the step of deriving the first symbol group and the second symbol group from the authentication reference information.

34. The method as claimed in claim 30, wherein the real matching symbol is derived into '$X_1X_2X_3 \ldots X_{n-2}X_{n-1}$', and the real password symbol is derived into '$X_2X_3 \ldots X_{n-2}X_{n-1}X_n$' when the authenticating reference information is '$X_1X_2X_3 \ldots X_{n-2}X_{n-1}X_n$' in the step of deriving the first symbol group and the second symbol group from the authentication reference information.

35. The method as claimed in claim 30, wherein the real matching symbol is derived into '$X_1X_2X_3 \ldots X_{n-2}X_{n-1}X_n$', and the real password symbol is derived into '$X_2X_3 \ldots X_{n-2}X_{n-1}X_nX_1$' when the authenticating reference information is '$X_1X_2X_3 \ldots X_{n-2}X_{n-1}X_n$' in the step of deriving the first symbol group and the second symbol group from the authentication reference information.

36. The method as claimed in claim 24, further comprising the step of encoding matched symbol group information when the matched symbol group is inputted to the authentication processing means for carrying out the authenticating process via a communication network.

37. The method as claimed in claim 24, wherein matched symbol group information is used as index information for displaying a communication terminal when the matched symbol group is inputted to the authentication processing means for carrying out the authenticating process via the communication network.

* * * * *